(12) United States Patent
Forster et al.

(10) Patent No.: US 11,740,107 B2
(45) Date of Patent: *Aug. 29, 2023

(54) SENSOR SYSTEM VERIFYING DATA RELATED TO A MOVEMENT OF AN OBJECT

(71) Applicant: Infineon Technologies AG, Neubiberg (DE)

(72) Inventors: Bernhard Forster, Finkenstein (AT); Friedrich Rasbornig, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 111 days.

This patent is subject to a terminal disclaimer.

(21) Appl. No.: 17/380,520

(22) Filed: Jul. 20, 2021

(65) Prior Publication Data

US 2021/0348953 A1 Nov. 11, 2021

Related U.S. Application Data

(63) Continuation of application No. 14/920,329, filed on Oct. 22, 2015, now Pat. No. 11,067,415.

(30) Foreign Application Priority Data

Oct. 24, 2014 (DE) .......................... 102014015747.4

(51) Int. Cl.
*G01D 5/248* (2006.01)
*G01P 3/487* (2006.01)
(Continued)

(52) U.S. Cl.
CPC .............. *G01D 5/248* (2013.01); *G01P 3/487* (2013.01); *G01P 21/02* (2013.01)

(58) Field of Classification Search
CPC ..................................................... G01D 5/248
See application file for complete search history.

(56) References Cited

U.S. PATENT DOCUMENTS 11,067,415 B2* 7/2021 Forster .................... G01P 3/487
2001/0052849 A1* 12/2001 Jones, Jr. ............. G08B 21/028
340/572.1
(Continued)

FOREIGN PATENT DOCUMENTS

CN 101688881 A 3/2010
CN 102667414 A 9/2012
(Continued)

OTHER PUBLICATIONS

German Patent Office, Office Action issued in DE 10 2014 015 747.4, dated Jul. 17, 2015, 7 pgs. (German language only).
(Continued)

*Primary Examiner* — Joseph H Feild
*Assistant Examiner* — Pameshanand Mahase
(74) *Attorney, Agent, or Firm* — Banner & Witcoff Ltd.

(57) ABSTRACT

A sensor system for sensing movement of an object, including: a first sensor providing a first signal along a first signal path on a semiconductor chip, the first signal being used to determine a first characteristic of the movement; a second sensor providing a second signal along a second signal path on the semiconductor chip, the second signal being used to determine a second characteristic of the movement; and an alarm circuit configured to issue a fault warning when there is a violation of a predefined relationship between the first signal and the second signal based on a missing or additional portion of the first signal or the second signal.

20 Claims, 14 Drawing Sheets

(51) Int. Cl.
*G01P 21/02* (2006.01)
*G01P 1/11* (2006.01)
*B60Q 1/54* (2006.01)
*B61L 1/20* (2006.01)
*B65G 43/10* (2006.01)

(56) References Cited

U.S. PATENT DOCUMENTS

| | | | |
|---|---|---|---|
| 2002/0035315 A1 | 3/2002 | Ali et al. | |
| 2004/0005150 A1* | 1/2004 | Takeshita | H04B 10/00 |
| | | | 398/32 |
| 2008/0177499 A1* | 7/2008 | Maone | G01P 13/02 |
| | | | 702/147 |
| 2010/0026279 A1* | 2/2010 | Vig | G01P 3/488 |
| | | | 324/173 |
| 2012/0192951 A1 | 8/2012 | Yodfat et al. | |
| 2014/0268256 A1* | 9/2014 | Mayama | H04N 1/00092 |
| | | | 358/496 |
| 2015/0070131 A1* | 3/2015 | Beaurepaire | H04W 4/021 |
| | | | 340/5.8 |

FOREIGN PATENT DOCUMENTS

| | | |
|---|---|---|
| CN | 203326937 U | 12/2013 |
| CN | 103913189 A | 7/2014 |
| DE | 102004025776 B3 | 7/2005 |

OTHER PUBLICATIONS

Office Action dated May 17, 2018 for Chinese Patent Application No. 201510691975.8.

* cited by examiner

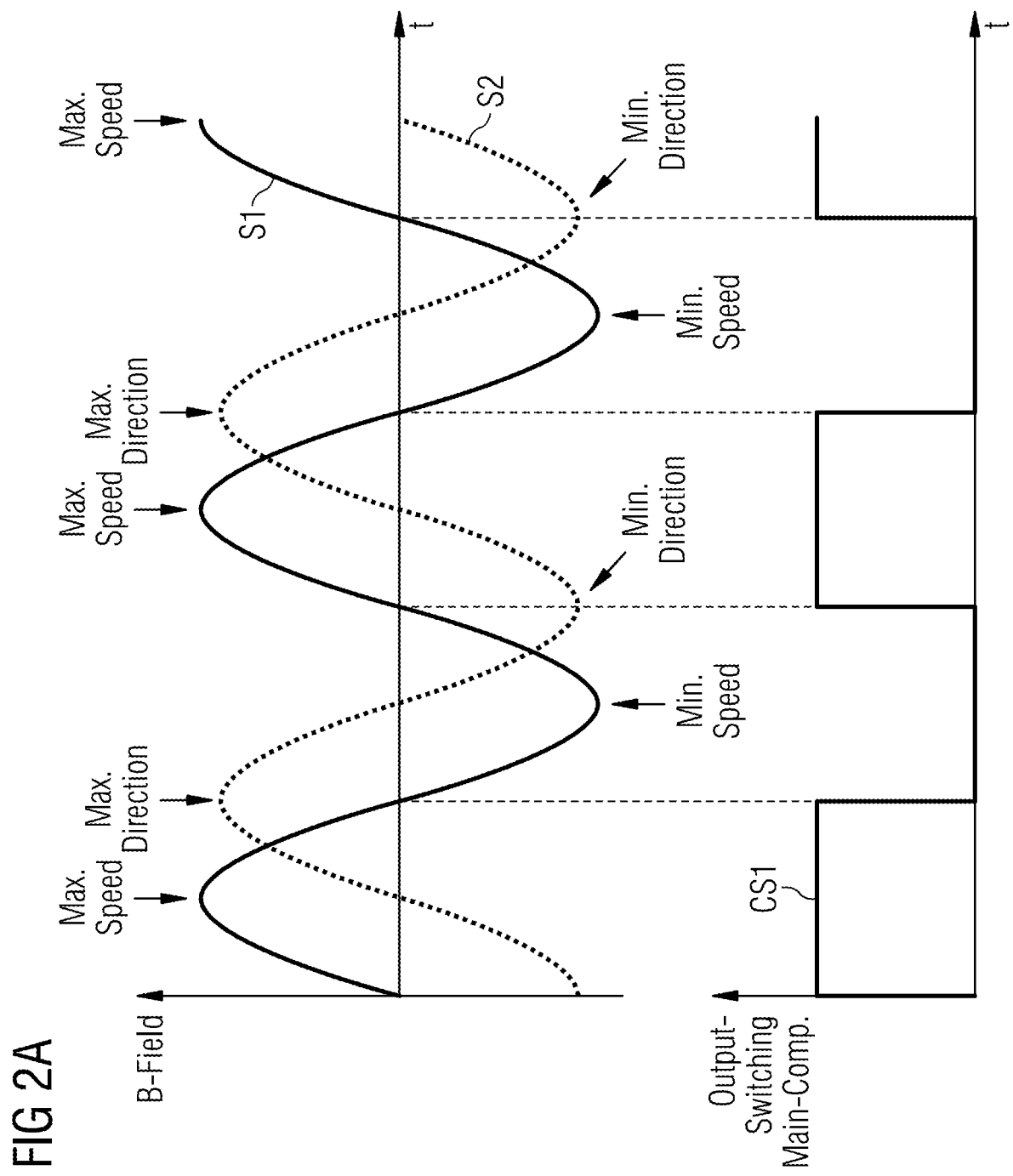

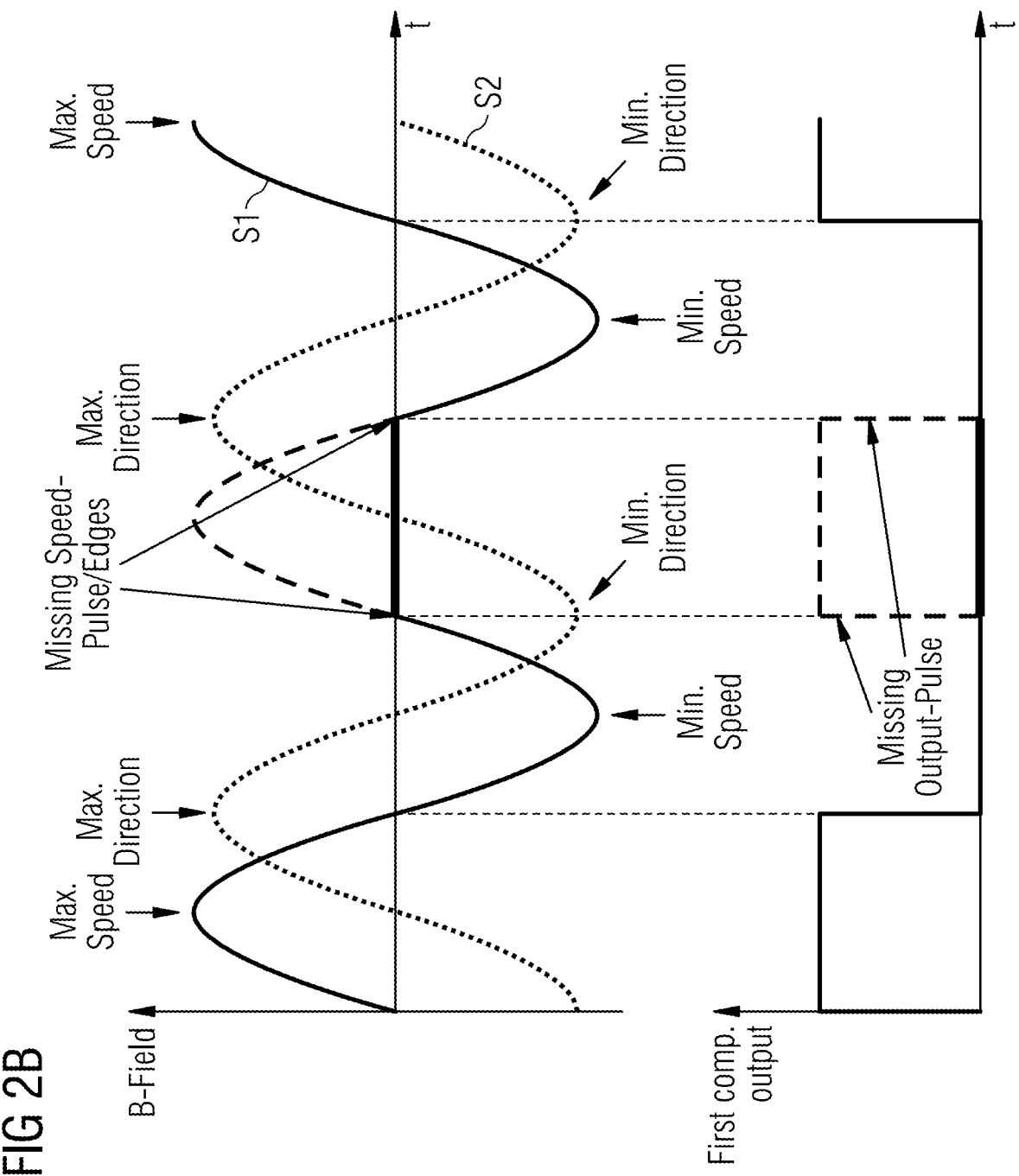

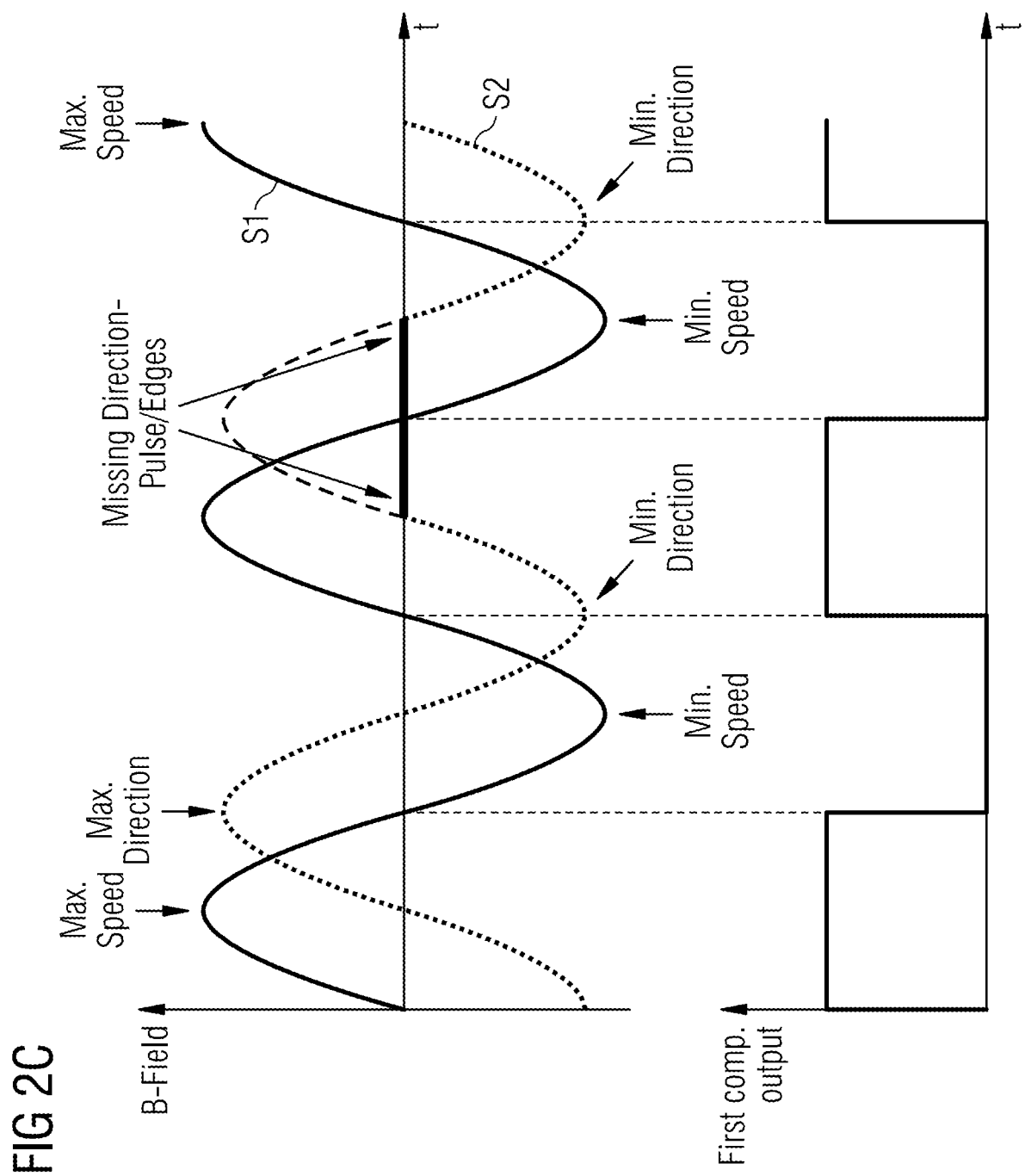

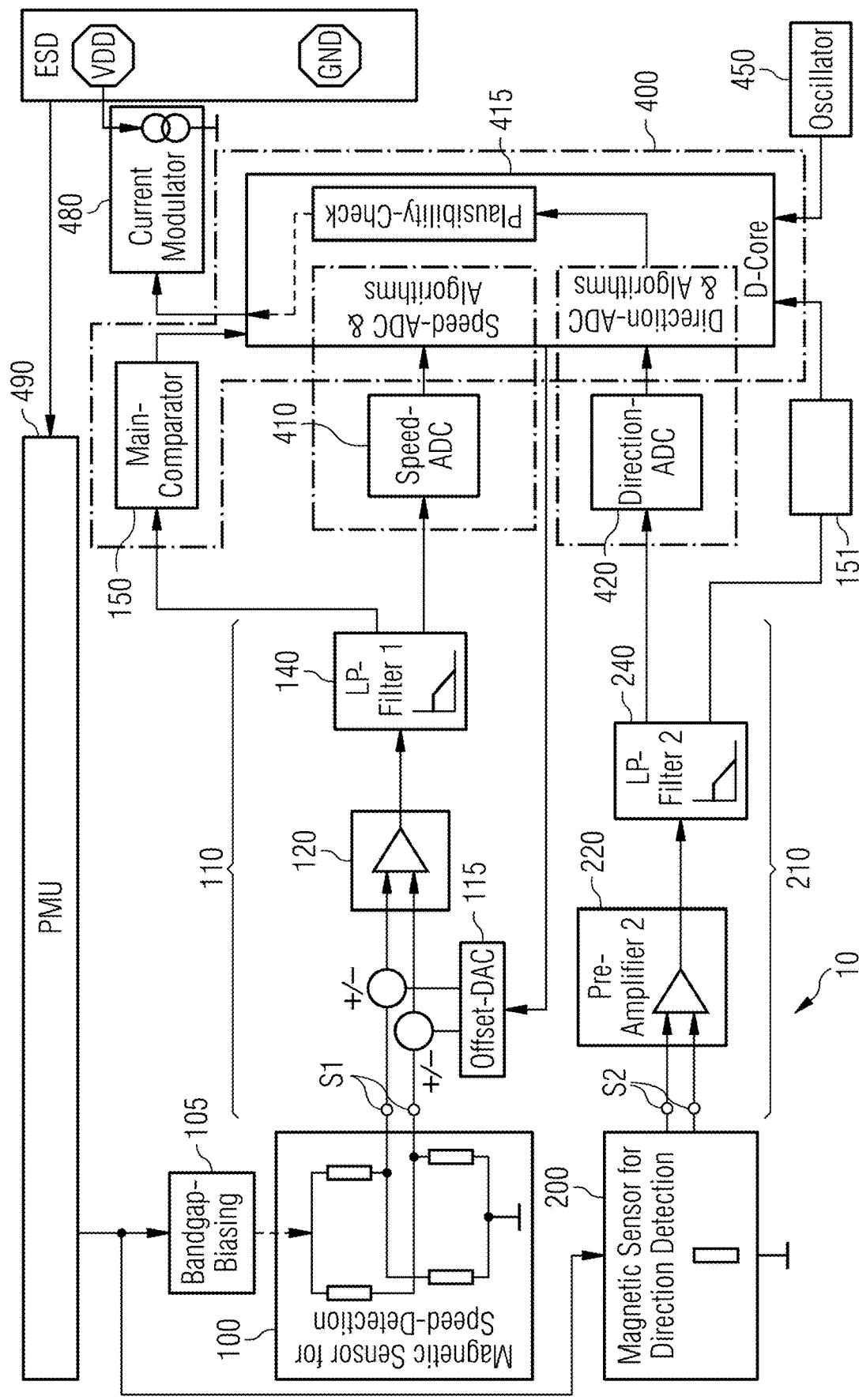

SENSOR SYSTEM VERIFYING DATA RELATED TO A MOVEMENT OF AN OBJECT

TECHNICAL FIELD

The present application relates to a sensor system with an alerting unit for sensing and verifying movement of an object and to an alerting unit for verifying a predefined relationship between to signals.

BACKGROUND

There is a large variety of applications wherein movement of an object needs to be characterized with regards to velocity and/or direction of the movement. Such measurements are of particular interest in anti-blocking systems (ABS) within a car or vehicles in general as well as in setups measuring a linear movement of an actuator.

Often such speed and direction sensors are used in combination with a pole wheel or tooth wheel. The pole wheel typically comprises a number of alternating magnetic poles. When the wheel rotates, a change in magnetic field is sensed by a sensor and may be used in order to derive therefrom the above-mentioned characteristics of the movement (see FIG. 1B).

Alternatively or additionally the speed and direction sensors may be used in combination with a linear sequence of alternating magnetic poles, for example arranged along a linear path of an actuator. In such a setup when the actuator moves along the linear path (see FIG. 1A), a change in magnetic field is sensed by a sensor and may be used in order to derive therefrom speed and/or direction of the linear movement.

In a large variety of systems employing movement and direction sensors, it is of interest to verify that the signals generated by the sensor i.e. direction and/or speed of the movement, are consistent in the sense that one of the signals does not contradict the other. In the prior art such a plausibility check of direction and/or speed signal was achieved by redundant systems, wherein two individual sensors are used with the first sensor verifying the values from the second sensor and vice versa. In such a setup, the plausibility check would have been achieved by an ECU. Such an approach is obviously quite expensive and there are just limited means to check whether the sensor is still generating reliable signals or not.

Further it is according to the prior art not possible to detect whether a mistake or a discrepancy between the speed and the direction signal is caused by a failure of one of the individual sensors or by a fault of the ECU performing the plausibility check, as may be required according to functional safety standards as for example defined in ISO 26262.

The present invention overcomes these problems of the prior art by providing a sensor system for sensing movement of an object. The sensor system according to the invention may in some embodiments relate to an integrated sensor system, even more preferably to an integrated monolithic sensor system. The problems of the prior art are further overcome by an alerting unit according to the present invention.

The sensor system for sensing movement of an object may comprises a first sensor element, a second sensor element and an alerting unit. The first sensor element may be a magnetic sensor element. The first sensor element may provide a first signal along a first signal path on a semiconductor chip. The first signal may be indicative for a velocity of the movement. The second sensor provides a second signal along a second signal path on the semiconductor chip. The second signal may be indicative for a direction of the movement. The alerting unit may be disposed on the semiconductor chip. The alerting unit may be configured to issue a warning if a predefined relationship between the first signal and the second signal is being violated.

Further aspects of the sensor system according to the invention become apparent from the dependent claims.

The present invention further relates to an alerting unit. The alerting unit may be configured to receive a first signal and a second signal. The alerting unit may be configured to monitor a predefined relationship between the first signal and the second signal.

In some embodiments the alerting unit is further configured to issue a warning in case the predefined relationship is violated.

Further advantages and properties of the alerting unit according to the present invention will become apparent from the dependent claims.

BRIEF DESCRIPTION OF THE DRAWINGS

FIG. 2A illustrates a relationship of a speed signal S1 and a direction signal S2 provided by a speed sensor and a direction sensor.

FIG. 2B illustrates a time evolution of speed signal S1 and direction signal S2 sensed by a magnetic sensor configured to measure speed and direction of the movement with a missing speed pulse or missing speed pulse edges.

FIG. 2C illustrates a time evolution of a speed signal S1 and a direction signal S2 with a missing direction pulse or missing direction pulse edges.

FIG. 3C illustrates another implementation of the sensor system according to the invention.

DETAILED DESCRIPTION

Figure 1A:
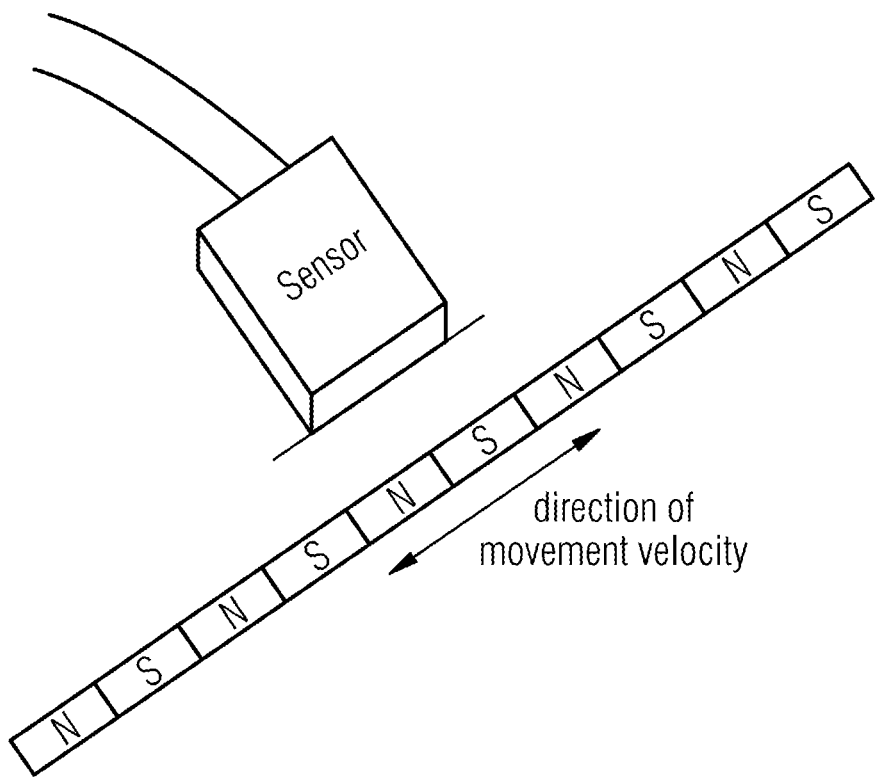
FIG. 1A illustrates a magnetic sensor in combination with an arrangement of alternating magnetic poles along a direction of movement.

In the following, various embodiments will be described in detail with reference to the attached drawings. It is to be understood that these embodiments serve illustrative purposes only and are in no way to be construed as limiting the scope of the present invention.

For example, while embodiments are described comprising a plurality of different details, features or elements, in other embodiment, some of these details, features or elements may be omitted, may be implemented in a different manner than shown and/or may be replaced by alternative details, features or elements. Additionally or alternatively, in further embodiments, additional details, features or elements not explicitly described herein may be present. Connections or couplings, for example, electrical connections or couplings shown in the drawings as described herein may be direct connections or indirect connections. Indirect connections being connections with one or more intermediate elements, provided the coupling function is maintained.

Some embodiments relating to sensing elements may comprise magnetic field sensors or sensor elements. Alternatively and without any limitation any other sensor adapted to measure a movement of an object may be considered.

Some embodiments relating magnetic field sensors and magnetic field sensor may for example comprise an XMR sensor. The term XMR sensor as used herein may refer to sensors being based on one or more magneto-resistive (MR) effects. Examples for magneto-resistive effects include GMR (Giant Magneto Resistance), CMR (Colossal Magneto Resistance), AMR (Anisotropic Magneto Resistance) or TMR (Tunneling Magneto Resistance). In another example, a magnetic field sensor may comprise a Hall sensor. Hall sensors in the context of this application may be sensors relying on the Hall affect to detect a magnetic field. Examples for Hall sensors include vertical Hall sensors or lateral Hall sensors. Hall sensors may be operated based on any conventional techniques, for example a spinning current technique or any other biasing technique.

Without any limitation, a sensor system according to the invention may comprise a combination of sensor elements employing diverse measurement principles, for example a vertical Hall sensor element as first sensor element and any xMR sensor element as second sensor element. It may be of interest for the first sensor element to be mostly sensitive to a first component of the external magnetic field, while the second sensor element is mostly sensitive to a second component of the external magnetic field that is perpendicular to the first magnetic field component.

In some embodiments of the sensor system according to the invention for sensing movement of an object, the sensor system is a monolithic integrated sensor system. The sensor system may comprise a first sensor, a second sensor, and an alerting unit. The first sensor, also referred to as a first sensor element in the following, may be a magnetic sensor element. The first sensor element may provide a first signal along a first signal path on a semiconductor chip. The first signal may be indicative for a velocity of the movement. The second sensor element may provide a second signal along a second signal path on the same semiconductor chip. The second signal may be indicative for a direction of the movement. The alerting unit on the semiconductor chip may be configured to issue a warning, if a predefined relationship between the first signal and the second signal is being violated.

In some embodiments of the sensor system the alerting unit may further be configured to monitor the first signal and/or the second signal.

In some embodiments of the sensor system the predefined relation may be a selectable free predefined relationship.

In some embodiments of the sensor system, the predefined relationship may be a selectable predefined relationship between the first signal and the second signal. The first signal and the second signal may in some embodiments be quasi-periodical signals or periodical signals. The term periodical may be construed as a signal substantially repeating after a certain period T. A quasi-periodical signal shall be understood in the context of this disclosure as a signal substantially repeating over a given time frame. This is to say that the quasi-periodical signal may comprise periods, wherein the signal vanishes, drops to a given value, or the like. In some embodiments of the sensor system according to the present invention, the first signal and the second signal may be quasi-periodical signals of substantially identical frequency.

In some embodiments the sensor system is a monolithic integrated sensor system on the semiconductor chip.

In some embodiments the alerting unit may comprise a first comparator configured to indicate that the first signal is above a first base value. The first comparator may be arranged downstream the first sensor within the first signal path.

In some embodiments the sensor system may further comprise an offset unit within the first signal path. The offset unit may be configured to impose an adjustable offset on the first signal. Without limitation the imposable offset may be a fixed offset imposed on the first signal.

In some embodiments of the sensor system, a first analog-to-digital converter for converting at least the first signal may be present.

In some embodiments the sensor system may further comprise a multiplexer forwarding the first signal and the second signal to the first analog-to-digital converter.

In some embodiments of the sensor system, the offset unit may comprise a digital-to-analog converter configured to receive a digital offset from the alerting unit.

In some embodiments of the sensor system the alerting unit may be configured to correct or invalidate the first signal and/or the second signal in case of the warning being issued.

In some embodiments the alerting unit may further be adapted to extract a minimum and/or a maximum value of the second signal during time periods for which the first comparator indicates the first signal being above the first base value, in particular the first base value being zero.

Alternatively or additionally the alerting unit may further be adapted to extract a minimum and/or maximum value of the first signal during time periods for which, for example a second comparator, indicates the second signal being above a second base value, in first comparator indicates the second signal being above a second base value, in particular the second base value being identical to the first base value.

Figure 1B:
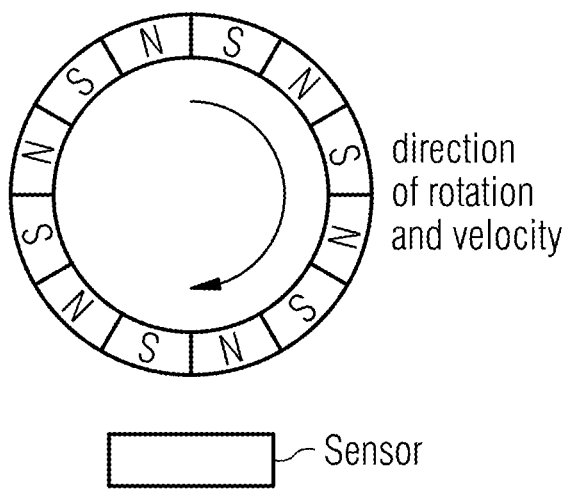
FIG. 1B illustrates a magnetic field sensor configured to detect a direction of rotation and a velocity of the rotation, for the example of a pole wheel mountable to a rotating object.

FIG. 2A illustrates a relationship over time for a first signal S1 indicative for a velocity of the moving object and a second signal S2 indicative of a direction of the moving object as sensed by the sensor system 10 (see for example FIG. 3A) according to the invention, wherein the sensor system 10 is sensitive to the velocity and the direction of the movement. It is to be noted that the first signal S1 and the second signal S2 are substantially of identical frequency in FIG. 2A. Further, the first signal S1 indicative of the velocity or speed of the object is substantially 90 degrees out of phase with the direction signal S2 measured by the sensor system 10. It is of advantage to arrange the sensor system 10 such that the first signal S1 and the second signal S2 are substantially 90 degrees out of phase. If the movement (as illustrated in FIG. 1A and FIG. 1B) changes direction the relationship between the speed signal S1 and the direction signal S2 will be inverted, i.e. the speed signal S1 would be ahead of the direction signal S2, different to the situation depicted in FIG. 2A.

Choosing the first signal S1 and the second signal S2 90 degrees out of phase may be of interest for the following reasons as may be taken from FIG. 2A: Firstly, the first signal S1 for a right moving system crosses zero with a rising edge, while the second signal S2 shows a negative maximum (also referred to as minimum). Secondly, the first Signal S1 shows a positive maximum while the second signal S2 crosses zero with a rising edge. Thirdly, the first signal S1 crosses zero with a falling edge, while the second signal shows a maximum. And finally the second signal S2 crosses zero with a falling edge, while the first signal S1 shows a minimum.

A person of ordinary skill will readily understand that from this phase difference between the first signal S1 and second signal S2, a plausibility check for a right or left moving system could be implemented monitoring the above described relation of maxima, minima and zero crossings in both signals S1 and S2.

As an alternative approximation of a plausibility check for a right or left moving system, the approximation could be implemented by tracking a sequence over time of: a maximum in the first signal S1 to be followed by a maximum in the second signal S2, and followed by a minimum in the first signal S1, and a minimum in the second signal S2.

As yet another approximation of a plausibility check for a right or left moving system, the approximation could be implemented tracking an expected order of zero crossings over one cycle, namely for a right moving target: a zero crossing with a rising edge of S1 followed by a zero crossing with a rising edge of S2, followed by a zero crossing of S1 with a falling edge, and a zero crossing of S2 with a falling edge.

It will be apparent to a person of ordinary skill in the art that plausibility checks as those outlined above may be implemented in the analog domain or in the digital domain alike, in accordance with the present invention. The plausibility checks could be implemented as a circuit in the analog domain and/or the digital domain. One exemplary implementation of the plausibility check may be implemented at least in part as a piece of software, for example as ASIC running on a DSP, the DSP being part of the digital domain or at least part of the alerting unit according to the invention, as will be explained in more detail further down.

It is further to be noted that for the context of the present disclosure analog domain shall be construed as a portion of a circuit or device not being synchronized to a clock.

It may by convenient to use (switching) comparators 151, 152 (best seen in FIG. 4A), for example in the first signal path 110. The first comparator 151 could be used to indicate whether the first signal S1 is positive or not. For the positive half waves of the first signal S1, the output CS1 of the first comparator 151 (also referred to as switching comparator) would be a positive square wave, while during periods wherein the speed signal S1 is below or equal to Zero, the comparator would provide a zero signal, as depicted in the lower portion of FIG. 2A.

A person of ordinary skill will understand that the comparators 151, 152 are hence configured to indicate, whether the first signal S1 and/or the second signal S2 are above a given threshold, respectively, for example zero. Without limitation any other threshold values may be used however in combination with the first comparator 151 and/or the second comparator 152.

A person of ordinary skill in the art will further understand that it is of interest to verify that the first signal S1, in our example corresponding to a speed or velocity signal and the second signal S2, indicative of a direction of the movement—as measured by the sensor system—are consistent.

In ABS and/or electronic stability systems ESP, it is of interest to assure that no pulses in the speed signal S1 and/or the direction signal S2 are missing. Likewise it would be critical, if additional speed pulses in the first signal S1 and/or additional direction pulses in the second signal S2 appeared. Such additional or missing pulses in either of the first signal S1 and/or the second signal S2 would indicate an incorrect velocity and/or an incorrect direction. This could indicate to a control system of an automotive device, such as a car, that the speed is no longer 60 kilometers per hour but only 30 kilometers per hour, where different safety requirements need to be met. Likewise indicating an incorrect direction by a missing or additional pulse in the direction path, the second signal path 210 would indicate that a car is no longer driven with 80 kilometers in forward direction but in reverse. It is therefore of interest to provide means of indicating that the first signal S1 and the second signal S2 as measured by the sensor system are no longer consistent, so that an alerting unit 400 (best seen in FIG. 3A) may issue a warning.

FIG. 2B illustrates a situation wherein a speed pulse within the speed signal or first signal S1 is missing; while the second signal S2 does not show a missing pulse. Using a comparator within a speed signal path, the missing speed pulse within S1 would be translated into a missing pulse within the comparator output CS1 of the comparator 151.

FIG. 2C illustrates an evolution of the first signal S1 and the second signal S2 over time, wherein a direction pulse is missing within the second signal S2. So for the length of the direction pulse the expected phase relationship or fixed relationship between the first signal S1 and the second signal S2 is being violated. The violation of the required relationship between the first signal S1 and the second signal S2 may be used in order to identify such a glitch in the first signal S1 and/or second signal S2. It is to be noted that a comparator within the first signal path is not able to detect the missing direction pulse within the direction path.

Figure 3A:
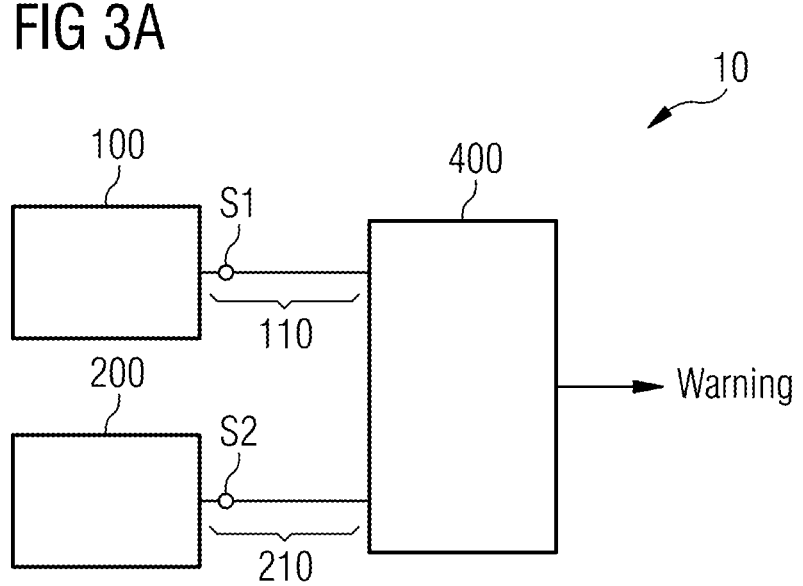
FIG. 3A illustrates a block diagram of a sensor system according to the present invention.

FIG. 3A illustrates the sensor system 10 according to the present invention. The sensor system 10 according to the present invention may comprise a first sensing element 100 configured to measure a first signal S1 indicative of a speed or velocity of the movement. The first sensing element 100 may provide the first signal S1 along a first signal path 110, thereby forwarding the first signal S1 to an alerting unit 400. The second sensing element 200 may be configured to measure a second signal S2. The second signal S2 being indicative of a direction of the movement of the object. The second signal S2 is being forwarded along a second signal path 210 to the alerting unit 400. The sensor system 10 may be implemented as a monolithic chip.

As described above, the first signal S1 and the second signal S2 are expected to be in a defined relationship. In particular the defined relationship may be a defined phase relation between the first signal S1 and the second signal S2, as indicated in FIG. 2A. If, however, additional and/or missing pulses are sensed by the first sensing element 100 and/or the second sensing element 200, such additional and/or missing pulses should be reliably detected by the sensor system 10 in order for the alerting unit 400 to issue a warning.

With regards to safety requirements, according to ISO26262 (Road vehicles—Functional safety) or ASIL (Automotive Safety Integrity Level) requirements the warning issued by the alerting unit 400 provides means to indicate that while signals provided by the first sensing element 100 and/or the second sensing element 200 appear plausible, an inconsistency or false state may be forwarded to an external unit. Therefore, the warning issued by the alerting unit 400 is adapted to indicate to a control unit, such as an ECU, that the first signal S1 and/or the second signal S2 are no longer reliable. More precisely, the predefined relationship between the first signal S1 and the second signal S2 is no longer maintained but violated.

Alternatively and/or additionally, the alerting unit 400 may invalidate the first signal S1 and/or the second signal S2, in cases where the warning is issued by the alerting unit 400. This enables the sensor system 10 to discard individual first signals S1 and/or second signals S2, or to invalidate the output signals of the sensor system 10 completely in cases where the warning has been issued.

Figure 3B:
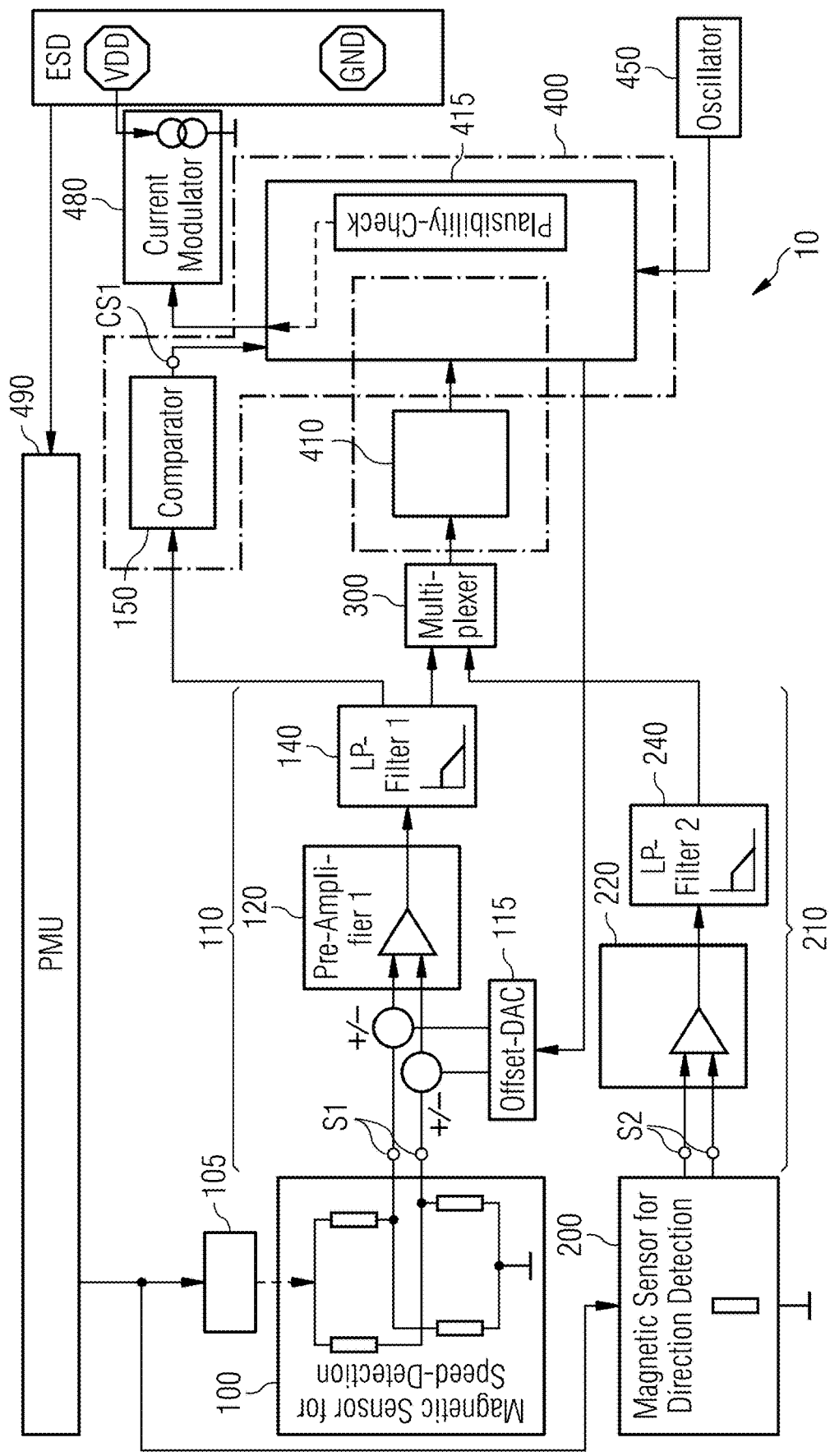
FIG. 3B illustrates an exemplary embodiment of a sensor system according to the present invention.

FIG. 3B illustrates an exemplary embodiment of the sensor system 10 according to the invention. A first sensing element 100 is configured to detect a velocity or speed of the moving object. For illustrative purposes this first sensing element 100 is illustrated as a differential sensing element comprising a Wheatstone bridge. However, other implementations of the first sensing element 100 providing the first signal S1 as one indicative of the velocity of the moving object are conceivable by a person of ordinary skill in the art.

The first signal S1 may be forwarded to a preamplifier 120 downstream the first sensing element 100 arranged along a first signal path 110. It may further be of interest to provide a first low-pass filter 140 within the first signal path 110. There may be provided a band gap biasing unit 105 providing a biasing in order to set an operating point of the first sensing element 100. A digital core 415 may provide an offset to a digital-to-analog converter 115, also referred to as offset-DAC, in order to adjust an offset for the first signal S1.

In FIG. 3B there is a second sensing element 200. The second sensing element 200 is configured to measure a second signal S2 indicative of a direction of the movement of the object. The second signal S2 is provided along a second signal path 210. It may be of interest to provide a second preamplifier 220 downstream the second sensing element 200. It may further be of interest to provide a second low-pass filter 240 arranged within the second signal path 210, typically downstream the second preamplifier 220. In the embodiment of FIG. 3B the first signal path 110 and the second signal path 210 share a common multiplexer 300. It is to be noted that this is just a mere design choice in order to save costs for an additional ADC within the second signal path, without departing from the invention.

It is to be understood that the signals fed into the multiplexer 300 are forwarded to a common ADC 410 who will analog to digital convert the first signal S1 and the second signal S2, alike. Such an implementation may be of interest in order to save costs and space for a second ADC dedicated to the second signal path 210, in addition to an ADC dealing with signals along the first signal path 110. It is to be understood that in the embodiment of FIG. 3B the alerting unit 400 is formed by a digital core 415 receiving a digital representation of the first signal S1 and/or a digital representation of the second signal S2, preferably provided by the common ADC 410. It is to be noted that the comparator 151 shown in the embodiment of FIG. 3B receives only an analog signal representative for the first signal S1. The output of the first comparator 151 is forwarded to the digital core 415 of the alerting unit 400. Without any limitation there may be a further comparator 152 (not shown) provided receiving an analog signal representing the second signal S2. Providing the first comparator 151 and the further or second comparator 152 for each of the first signal S1 and the second signal S2 may be of interest in order to achieve comparator signals CS1, CS2 representing the first signal S1 and the second signal S2 alike, as was illustrated in FIGS. 2A-2C for the first signal, respectively.

According to the embodiment of FIG. 3B the digital core 415 may perform the plausibility check, i.e. a check of additional and/or missing pulses within the first signal S1 and/or the second signal S2 over time, as was discussed with regards to FIGS. 2A-2C. It is to be understood that the comparator 151 may be of interest in order to provide some fault check along the first signal path 110. In more general terms the (first) comparator 151 may be of interest in order to monitor the predefined relationship between the first signal S1 and the second signal S2.

Should the alerting unit 400 receive within the digital core the comparator signal CS1 from the comparator 150, while the digital representation of the first signal S1 vanishes or disappears, this would be an indication that either the common multiplexer 300 and/or the common ADC 410 has a problem and is therefore no longer reliable.

Under the same token, should the altering unit 400 receive a digital representation of the first signal S1 with zero crossings, maxima, and/or minima, while the first comparator signal CS1 vanishes or is constant (i.e. without switching behavior), this could be an indication that the first comparator 151 is faulty.

Similarly, the further comparator 152 within the second signal path 210 (best seen in FIG. 4A) may be used in order to indicate an error of the common multiplexer 300 and/or the common ADC 410. As explained for the first signal S1, should the alerting unit 400 receive a digital representation of the second signal S2 comprising zero crossings, maxima, and/or minima, while the second comparator signal CS2 vanishes or is constant (i.e. without switching behavior), this could be an indication that the second comparator 152 is faulty.

As several of the automotive sensor systems are operated in a current mode, the output of a plausibility check within the digital core 415 may be forwarded to a current modulator 480 in order to provide a current signal corresponding to the plausibility signal, in order to indicate the plausibility signal to a (remote) ECU.

The signal generated by the current modulator 480 would indicate whether the sensor system 10 is working properly or not. The embodiment of FIG. 3B may further comprise an optional oscillator 450 providing a defined frequency to the alerting unit 400. The sensor system 10 of FIG. 3B may further comprise a power management unit 490 providing power to the first sensing element 100 and/or the second sensing element 200 and/or further components of the sensor system 10 according to FIG. 3B.

The current modulator 480 typically provides a current modulation between current levels, such as 3.5, 7 or 14 milliampere in order to indicate different states of the first signal S1 and/or the second signal S2. Typically the first signal S1 and/or the second signal S2 are indicated as a pulse width modulated signal. In case the plausibility check was not successful, the current modulator 480 may further be configured to invalidate or cancel the first signal S1 and/or the second signal S2 from being forwarded to the output of the current modulator 480. It is to be understood that the alerting unit 400 within FIG. 3B comprises the comparator 151, the digital core 415 and optionally the common ADC 410.

FIG. 3C illustrates a further embodiment of the sensor system 10 according to an embodiment of the present invention. Like entities to those already discussed within FIG. 3B are given identical reference numerals; unless stated otherwise. Different to the embodiment of the sensor system 10 according to FIG. 3B, a first ADC 410 (also referred to as individual ADC 410) is provided for the first signal S1 along the first signal path 110, while a second ADC 420 is provided along the second signal path 210. As before the digital core 415 may provide an offset to a digital-to-analog converter 115 in order to adjust an offset for the first signal S1. Likewise a further offset DAC (not shown) may be provided within the second signal path 210, should imposing an offset on the second signal S2 measured by the second sensing element 200 be of interest, for example due to the sensor type used as the second sensing element 200.

Further different to FIG. 3B, the second signal path 210 comprises the second comparator 152 providing square wave signal or comparator signal CS2 as discussed in FIGS. 2A-2C for the direction signal S2 indicative for the direction of the movement, too. By provision of the comparator 151 within the first signal path 110, it becomes possible to check the first ADC 410 terminating the first signal path 110 for any errors. This is to say while the comparator 150 still provides the square waves discussed in FIGS. 2A-2C, but the first ADC 410 does not provide a corresponding digital representation of the first signal S1, this would be indicative for the first ADC 410 to have a problem, such as for example a "stuck at" error. If, however, the first comparator 151 and a first ADC 410 both provide vanishing signals, no longer representing periodical or quasi-periodical signals of substantially identical frequency, this would be indicative of the first sensing element 100, the preamplifier 120, the offset ADC 115, and/or the low-pass filter 140 having a problem.

Further, as explained before, the digital representation of the first signal S1 comprising minima, maxima and/or zero crossings while the first comparator signal CS1 vanishes or is constant (i.e. without switching behavior) may indicate that the second comparator 152 has a problem. The second comparator 152 within the second signal path 210 is configured to indicate when the second ADC 420 has a problem. Should the second comparator 151 provide the square wave periodical signal, as discussed with FIGS. 2A-2C, but the digital representation of the second signal S2 indicative for the direction of the movement, would not show the same quasi-periodical characteristic, this would indicate to the alerting unit 400 that the direction ADC 420 has a problem, and seems no longer to work reliably. As explained before, the digital representation of the second signal S2 comprising minima, maxima and/or zero crossings while the second comparator signal CS2 vanishes or is constant (i.e. without switching behavior) may indicate that the second comparator 152 has a problem.

If, however, both, the digital representation of S2 provided by the second ADC 420 and the analog signal provided by the second comparator 152 would no longer provide the (quasi-) periodical signal, this would be indicative that the second sensing element 200, the amplifier 220, the low-pass filter 240 and/or the second ADC 420 are having a problem.

It is to be noted by the provision of first comparator 151 and/or the second comparator 152, the alerting unit 400 is able to communicate reliability information to an external system, such as an electronic control unit ECU (not shown), going beyond the indication whether the predefined relationship between the first signal and/or the second signal S2 are being maintained or violated.

It may be further noted that the alerting unit 400 as depicted in FIGS. 3B and 3C relies on the digital core 415. While the use of the digital core 415 for implementing the plausibility check may be convenient, the footprint in transistors may be considerable, thereby potentially hindering the interest to reduce footprint of transistors within safety critical devices.

It is to be understood that the alerting unit 400 as discussed before may be further implemented as an individual device combinable with a sensor system providing the first signal S1 along a first signal path 110 and the second signal S2 along the second signal path 210, with the first signal S1 being indicative of a velocity of movement and the second signal S2 being indicative of a direction of movement. Therefore the alerting unit 400 may be implemented as integrated semiconductor device coupleable to the first signal path 110 and the second signal path 210, respectively. The alerting unit 400 as disclosed herein may be further used in order to provide a functionality of issuing a warning if the predefined relationship between the first Signal S1 and the second signal S2 is being violated to such sensor systems not having this functionality before. The alerting unit 400 according to the present disclosure may therefore be thought of as an upgrade to existing sensor systems providing the first signal S1 and the second signal S2.

It is to be understood that the alerting unit 400 may be implemented as an individual device regardless whether the alerting unit 400 is implemented in the digital domain or partly in the digital and the analog domain, as discussed with the alerting unit 400 of FIGS. 3A to 3C. In case of the alerting unit 400 of FIG. 3B may further comprise a terminal for receiving the first comparator signal CS1 from the comparator 151. As mentioned before, analog shall be construed in the context of the alerting unit 400 as not being synchronized to a clock.

Figure 4A:
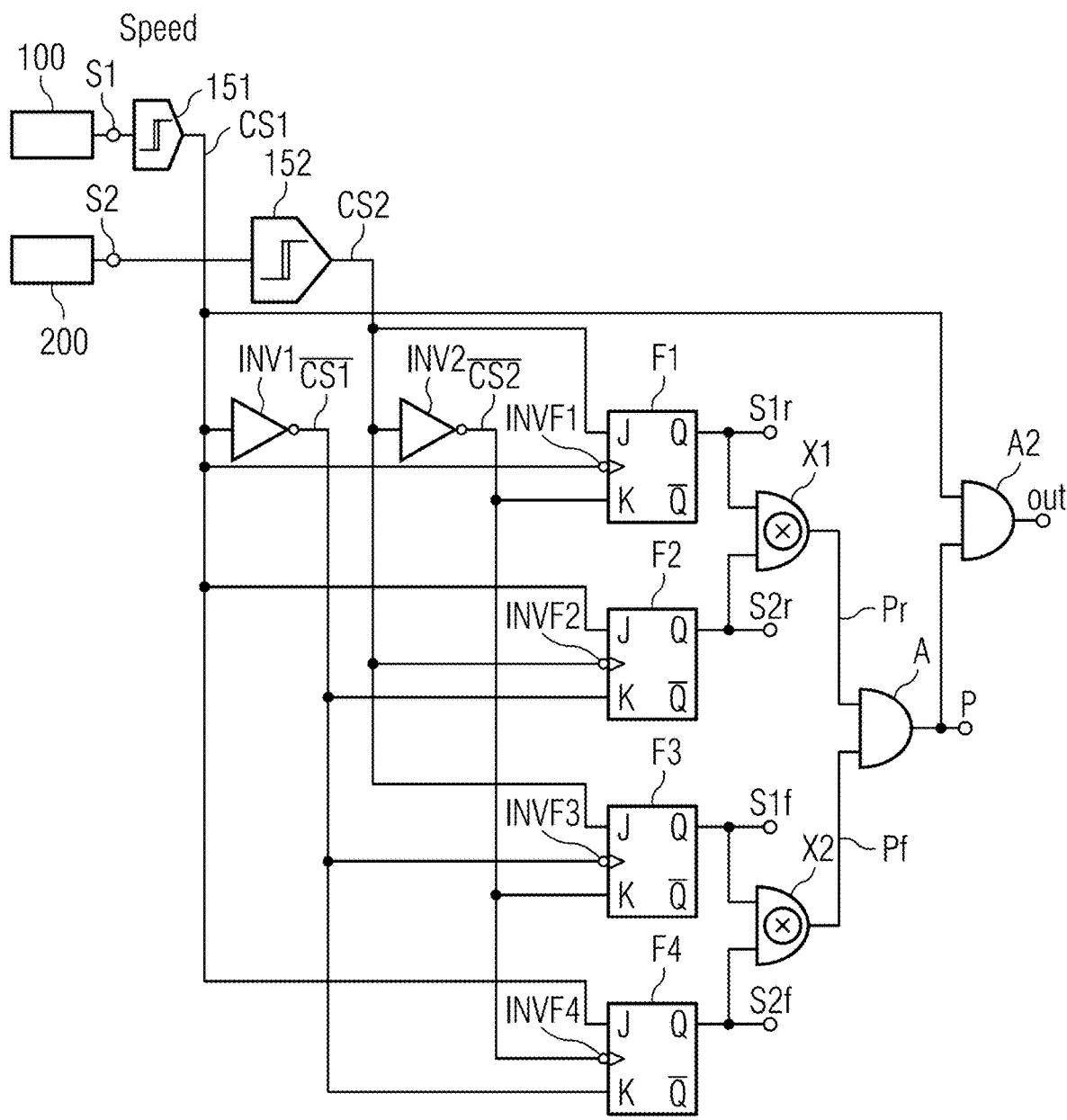
FIG. 4A illustrates an exemplary embodiment of the alerting unit according to the invention.

FIG. 4A shows an embodiment of the alerting unit 400 being implementable in the analogue domain. First sensing element 100 yielding the first signal S1 and the second sensing element 200 yielding the second signal S2 are depicted and this is to underline that the following alerting unit 400 of FIG. 4A may be used in combination with any first sensing element 100 and second sensing element 200 as schematically depicted in FIG. 3A.

It may be convenient for the alerting unit 400 to comprise a first terminal (not shown) to receive the first signal S1 from the first sensing element 100 and further to comprise a second terminal (not shown) to receive the second signal S2 from the second sensing element 200. Receiving the first and second signals S1, S2 may be achieved by dedicated connectors coupling the first signal path 110 to the first terminal and the second signal path 210 to the second terminal, respectively.

The first signal S1 is forwarded to a first comparator 151 generating a first comparator signal CS1 from the first signal S1. The second signal S2 is forwarded to a second comparator 152 generating a second comparator signal CS2 from the second signal.

A first inverter INV1 downstream the first comparator 151 provides an inverted version $\overline{CS1}$ of the first comparator signal CS1. The second comparator signal CS2 downstream the second comparator 152 is forwarded to a second inverting INV2 element generating an inverted second comparator signal $\overline{CS2}$.

Four memory elements F1, F2, F3, F4 are present in FIG. 4A. The four memory elements may be implemented as JK Flip Flops as known to a person of ordinary skill in the art. A person of ordinary skill will readily appreciate, that other embodiments of the memory elements F1, F2, F3, F4 may be implemented without departing from the spirit of the present invention. Each of the JK Flip Flops implementing the memory elements F1, F2, F3, F4 comprises a J-input, a K input and a control or toggle input, respectively. In the implementation depicted in FIG. 4A, each of the memory elements F1, F2, F3, F4 has an inverted control input, as indicated by the inverters INVF1, INVF2, INVF3, INVF4 at each of the control inputs, respectively. The JK Flip Flops implementing the memory elements F1, F2, F3, F4 further comprise a Q output and a Q output, which is an inverted version of the Q output.

Therefore the term control input for the remainder of this document shall also comprise implementations of memory elements F1, F2, F3, F4 with the inverters INVF1, INVF2, INVF3, INVF4, as depicted in FIG. 4A.

The first comparator signal CS1 corresponding to the first signal S1 is forwarded to the control input of the first memory element F1, the J-input of the second memory element F2, and the J-input of the fourth memory element F4. An inverter INV1 inverts first comparator Signal CS1 and provides an inverted first comparator signal $\overline{CS1}$ which is forwarded to the K-input of the second memory element F2, the control input of the third memory element F3, and the K-input of the fourth memory element F4.

The second signal S2 reaches a second comparator 152, thereby generating a second comparator signal CS2 corresponding to the second signal S2. The second comparator signal CS2 gets forwarded to the J input of the first memory element F1, the control input of the second memory element F2, and the J input of the third memory element F3.

The second comparator signal CS2 further gets inverted by a second inverter INV2 generating an inverted second comparator signal $\overline{CS2}$ which is forwarded to the K-input of the first memory element F1, the K-input of the third memory element F3, and the control input of the fourth memory element F4.

The Q output of the first memory element F1 implemented as a JK Flip Flop in the set-up described, will present a rising edge signal S1r. The signal S1r samples the second Signal S2 while the first signal passes zero with a rising edge.

The first output Q of the second memory element F2 will present a rising edge signal S2r. The signal S2r samples the first signal S1 while the second signal S2 passes zero with a rising edge.

The Q output of the third memory element F3 will be present a falling edge S1f. The signal S1f samples the second signal while the first signal S1 passes zero with a falling edge. The output Q of the fourth memory element F4 will present a falling edge signal S2f. The signal S2f samples the first signal while the second signal S2 passes zero with a falling edge.

The rising edge signal S1r may be coupled to the rising edge signal S2r using an exclusive OR-element X1, commonly also referred to as XOR-element. The exclusive OR-element X1 will produce a rising edge parity signal Pr.

The falling edge signal S1f may be coupled to the falling edge signal S2f via an exclusive OR-element X2. The XOR-element X2 will produce a falling edge parity signal Pf.

A person of ordinary skill in the art will appreciate that the rising edge signal S1r, the rising edge signal S2r, the falling edge signal S1f, and the falling edge signal S2f may be used in order to analyze the fixed relation, in particular a 90° phase relation between the first signal S1 and the second signal S2, as will be explained further down.

The falling edge parity signal Pf and the rising edge parity signal Pr may be coupled with an AND-element A to yield a plausibility flag P changing between ZERO and ONE, or a low and a high state.

According to the implementation depicted in FIG. 4A, the plausibility flag P having a value of low or ZERO is indicative for a fault within a sensor system 10, while a value of one in turns may indicate a reliable function of the sensor system 10. More precisely the plausibility flag P having a ZERO value is indicative of the predefined relationship, preferably the 90° phase relationship, between the first signal S1 and the second signal S2 being violated.

In the embodiment shown in FIG. 4A the first comparator signal CS1 may be combined with the plausibility flag P using a second AND combination A2, in order to implement the current modulator output of a current modulator 480 in combination with sensor systems operable in combination with a current interface, as was discussed with regards to FIGS. 3B and 3C. Such systems typically such a current interface may have three different current levels, in order to implement the logical states HIGH, LOW and ERROR; in such a current interface these values may be implemented by 7 milliampere, 14 milliampere, and 3.5 milliampere.

FIGS. 4B-4G schematically show a flow of the various signals as discussed with regards to the alerting unit 400 of FIG. 4A.

Figure 4B:
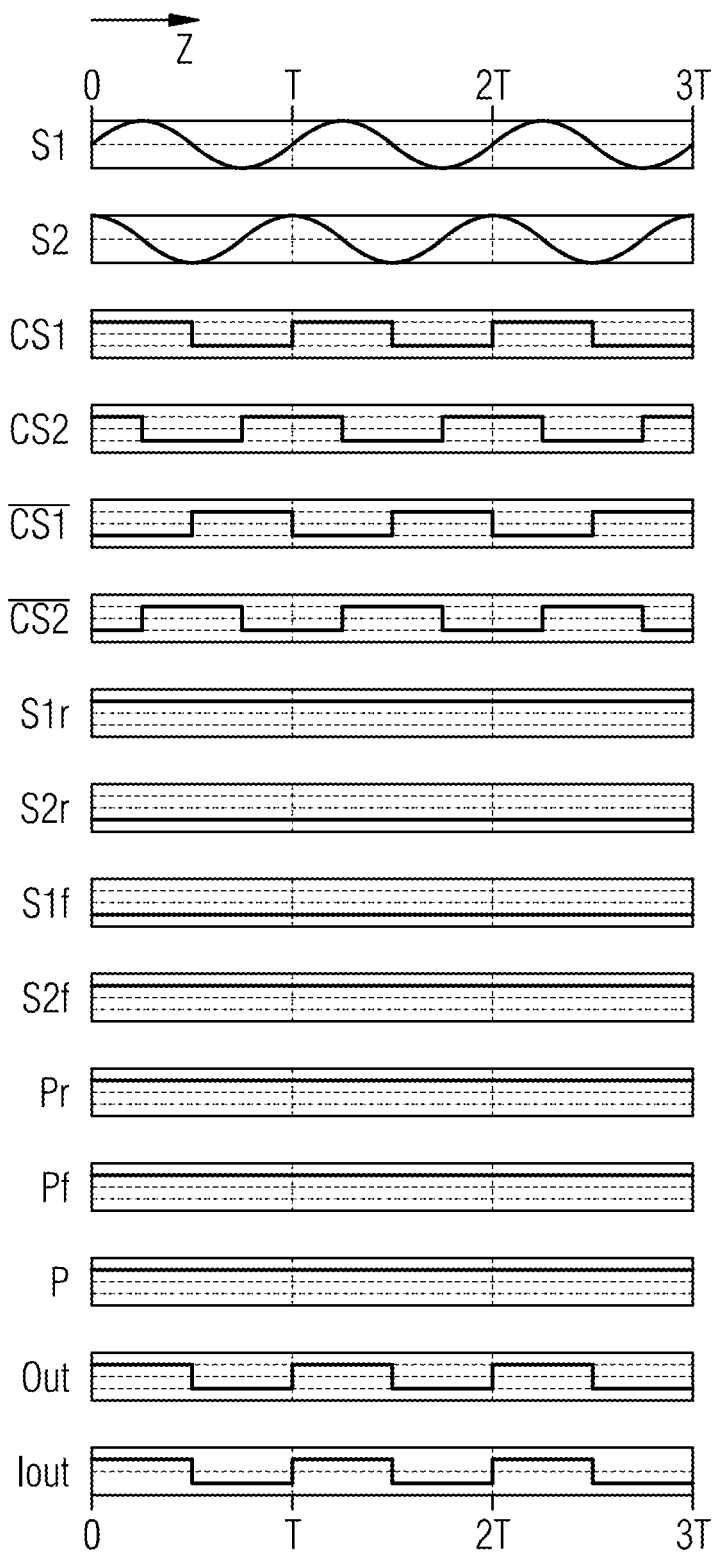
FIG. 4B illustrates a time evolution of signals related to the alerting unit over time for a right turning object.

The schematics shown in FIG. 4B are representative for a movement to the right in a set-up as in FIG. 1B or 1A over three cycles T of the (quasi-) periodical signals S1 and S2. In FIG. 4B, the predefined relationship, hence a 90° phase difference between S1 and S2 is clearly visible. The first comparator signal CS1 (for example of the first comparator 151 in FIG. 4A) indicates those portions of the first signal S1, wherein S1 is greater zero or positive in amplitude. CS1 indicates a ONE or TRUE state when S1 is greater zero and a ZERO state for those periods, wherein S1 is below zero.

Likewise the second comparator signal CS2 shown within FIG. 4B represents the output function of the second comparator 152 (for example in FIG. 4A) and indicates such periods, wherein the second signal S2 is greater zero, hence positive in amplitude with a state ONE or TRUE. Those periods wherein S2 is below zero are however indicated by a ZERO state of the signal CS2.

The signal $\overline{CS1}$ indicates an inverted version of the first comparator signal CS1 and is present at the output of the first inverter INV1. So for periods, wherein the first comparator signal CS1 is ONE the signal $\overline{CS1}$ is ZERO and vice versa.

The signal $\overline{CS2}$ indicates an inverted version of the second comparator signal CS2 and is present at the output of the second inverter INV2. So for periods, wherein the second comparator signal CS2 is ONE the signal $\overline{CS2}$ is ZERO and vice versa.

The signal S1r as present at the Q port of the first memory element F1, is indicative of a value of the second signal S2 sampled when the first signal S1 crosses zero with a rising edge. S1r is in the state ONE, i.e. a high state, as long as the second signal S2 shows a maximum, while the first signal crosses zero within a rising edge. In other words, S1r indicates the predefined relationship of the signals S1 and S2, namely the second signal S2 being 90° ahead of the first signal S1 for a right moving system, at a point in time, when S1 crosses zero within a rising edge.

The signal S2r as present at the Q port of the second memory element F2, is indicative of a value of the first signal S1 sampled when the second signal S2 shows a rising edge. S2R is in the state NULL, i.e. a low state, as long as the first signal S1 shows a minimum, while the second signal crosses zero within a rising edge. In other words, S2r indicates the predefined relationship of the signals S1 and S2, namely the second signal S2 being 90° ahead of signal S1 for a right moving system, at a point in time when S2 crosses zero within a rising edge.

The signal S1f as present at the Q port of the third memory element F3, is indicative of a value of the second signal S2 sampled when the first signal S1 crosses zero with a falling edge. S1f is in the state ZERO, i.e. a low state, as long as the second signal S2 shows a minimum, while the first signal S1 crosses zero within a falling edge. In other words, S1f indicates the predefined relationship of the signals S1 and S2, namely second signal S2 being 90° ahead of first signal S1 for a right moving system, when S1 crosses zero within a falling edge.

The signal S2f as present at the Q port of the fourth memory element F4, is indicative of a value of the first signal S1 sampled when the second signal S2 crosses zero with a falling edge. S2f is in the state ONE, i.e. a high state, as long as the first signal S1 shows a maximum, while the second signal S2 crosses zero within a falling edge. In other words, S2f indicates the predefined relationship of the signals S1 and S2, namely the second signal S2 being 90° ahead of the first signal S1 for a right moving system, when S2 crosses zero within a falling edge.

The rising edge parity signal Pr is present at the first exclusive OR-element X1. Pr stays in a high state, as long the predefined relationship between signals S1 and S2 is maintained with regards to S1r and S2r, namely at time points, wherein S1 and S2 cross zero within a rising edge, respectively.

The falling edge parity signal Pf is present at the second exclusive OR-element X2. Pr stays in a high state, as long the predefined relationship between signals S1 and S2 is maintained with regards to S1f and S2f, namely at time points, wherein S1 and S2 cross zero within a falling edge, respectively.

The plausibility flag P is present at the output of the AND element A stays at a high state provided the predefined relationship is maintained with regards to rising and falling edges of both signals S1 and S2, respectively.

The output signal out as present at the second AND element A2 shows a square wave behavior and may be used in sensor systems with a current modulator as was discussed with regards to FIGS. 3B and 3C.

The signal Iout represents a current output for a current interface with three current levels for normal operation of a right moving system. This is to say Iout represents a square wave behavior with positive half waves with amplitudes of 14 milliampere, while negative half waves have 7 milliampere amplitude. It is to be noted that the state shown in FIG. 4B does not depict a start-up phase until the first rising or falling edges of the first signal S1 and/or the second signal S2 have occurred. It is convenient for the start-up phase that the current amplitude of Ioutput has a third level, for example 3.5 mA, in order to indicate that the predefined relationship has not yet been reached.

Figure 4C:
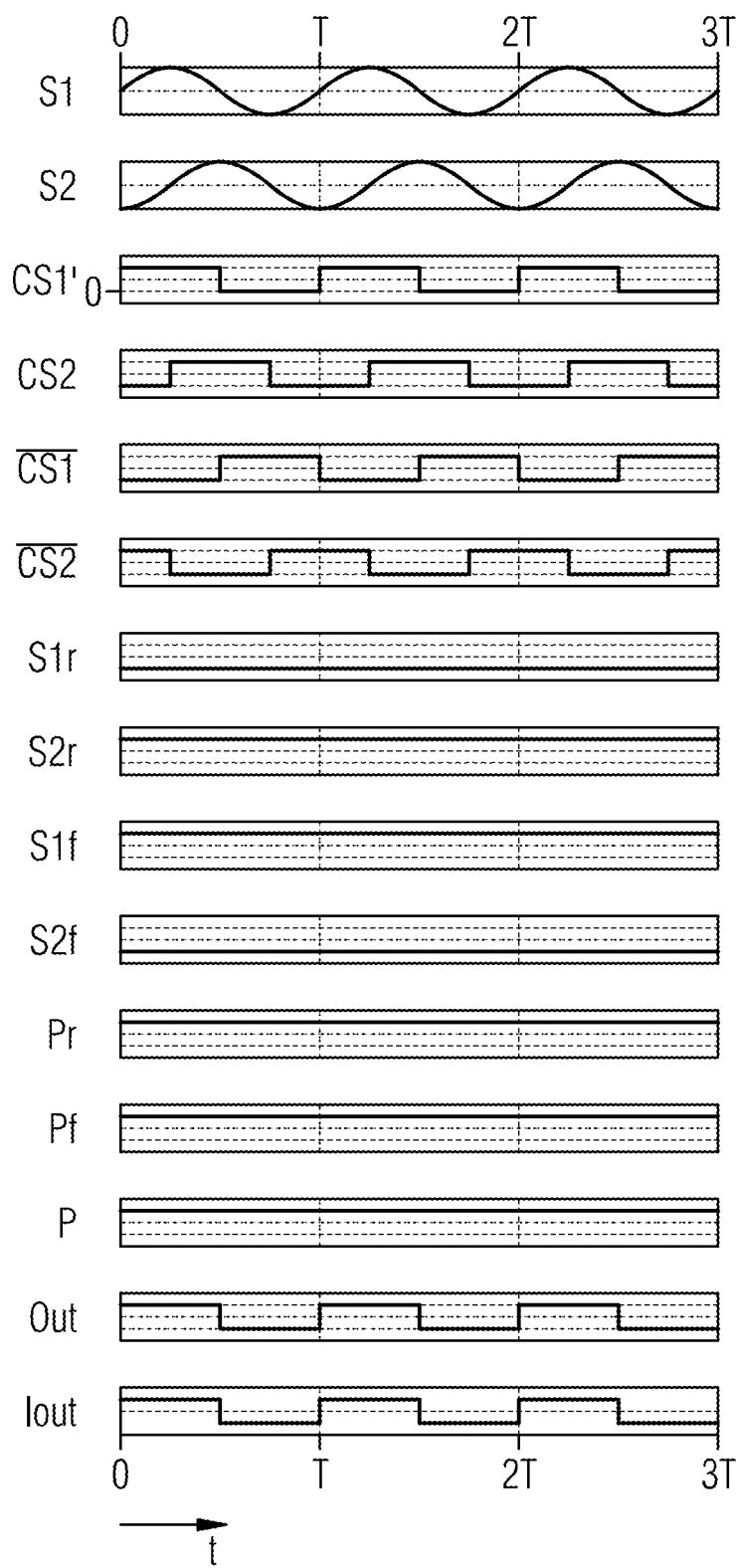
FIG. 4C illustrates a time evolution of signals related to the alerting unit over time for a left turning object.

FIG. 4C shows the signals S1, S2, CS1, CS2, $\overline{CS1}$, $\overline{CS2}$, S1r, S2r, S1f, S2f, Pr, Pf, P, out, and Iout as discussed before. Note that for the left turning system depicted in FIG. 4C the second signal S2 is 90° ahead of the first signal S1. This reversal in phase relationship will project onto signals CS1, CS2, $\overline{CS1}$, and $\overline{CS2}$ in an obvious manner.

For the situation depicted in FIG. 4C the relationship of S2 lagging 90° behind S1 is maintained over the three cycles displaced. Therefore the signals S1r, S2r, S1f, S2f are inverted (and could possibly b used for direction detection) and furthermore Pr, Pf, P, out, and Iout are identical to those discussed with regards to FIG. 4B. The alerting unit 400 as described herein is therefore configured to clearly identify and indicate a missing pulse within the first signal S1.

Figure 4D:
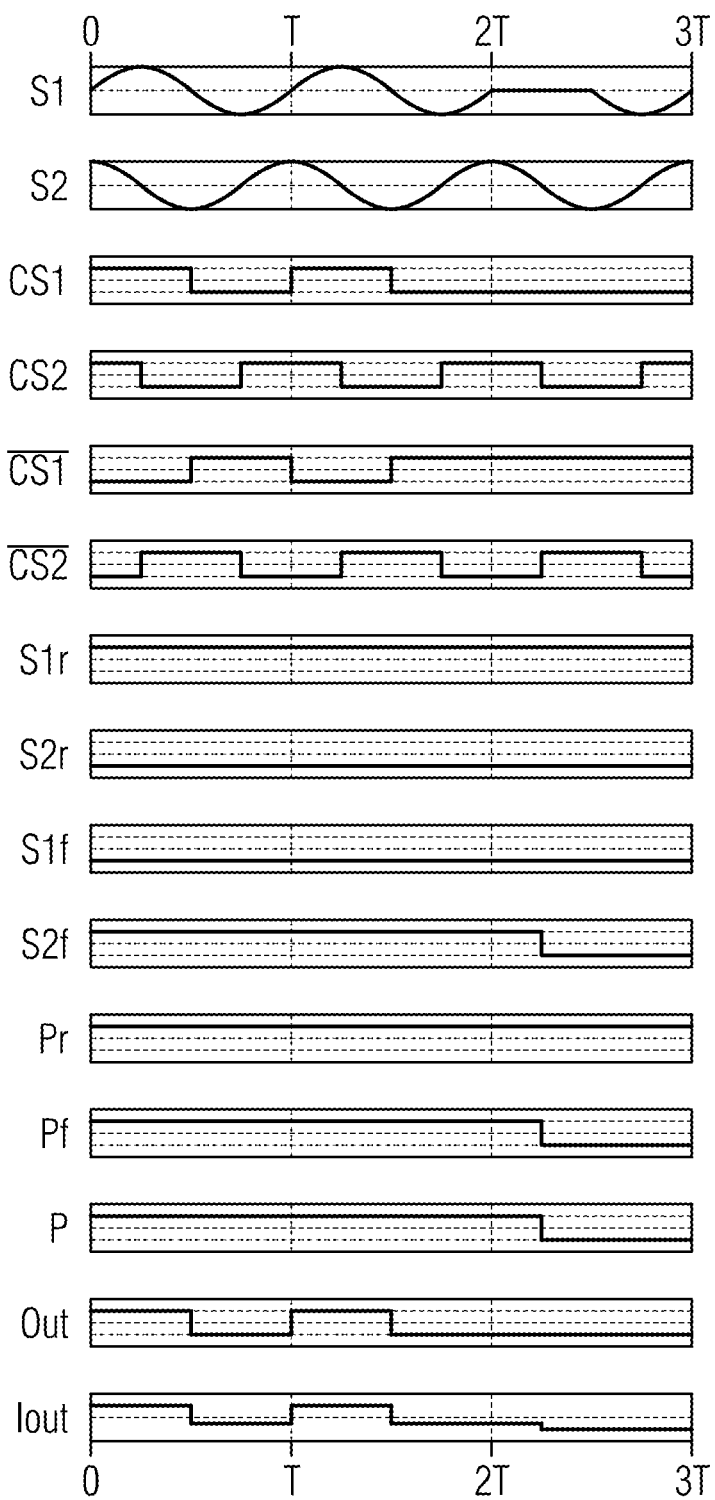
FIG. 4D illustrates a time evolution of signals related to the alerting unit over time for a right turning object with a missing pulse in the first signal.

FIG. 4D shows the signals S1, S2, CS1, CS2, $\overline{CS1}$, $\overline{CS2}$, S1r, S2r, S1f, S2f, Pr, Pf, P, out, and Iout as discussed before in connection with the alerting unit 400 for a system comprising an object moving to the right. Note that between 2T and 3T, hence in the last cycle shown in FIG. 4D, a positive half wave is missing within S1. So during the first half wave of the third cycle, the signal CS1 stays low where it should be high during normal operation. During the first positive half wave of S1 the predefined relationship of S1 being 90° ahead of S2 is violated. The missing positive half wave in S1 translates to a missing pulse within the first comparator signal CS1 and $\overline{CS1}$ for the first half wave of the third cycle, while the signals S2, CS2, and $\overline{CS2}$ are unaltered compared to the situation described in FIG. 4B.

The missing pulse in signal S1 becomes apparent in the signal S2f as this signal samples the value of the first signal S1 (the speed signal) while the second signal S2 crosses zero within a falling edge. Within the third cycle S2f drops to ZERO where it should be ONE or high during normal operation with the predefined relationship maintained.

The missing pulse in the third cycle of S1 further translates into a change of the falling edge parity signal Pf at the second exclusive OR-element X2. During the first half wave of the third cycle, Pf changes from a high state to a ZERO or low state. Pr stays in a high state however during the third cycle, as the predefined relationship between signals S1 and S2 is maintained with regards to S1r and S2r, namely at time points, wherein S1 and S2 cross zero within a rising edge, respectively.

The missing pulse in S1 further becomes apparent in the plausibility flag P changing from a high state to a ZERO or low state during the third cycle.

The output signal out changes in response to the change in the signal P. The change in the signal out is further apparent in the signal Iout, too.

Figure 4E:
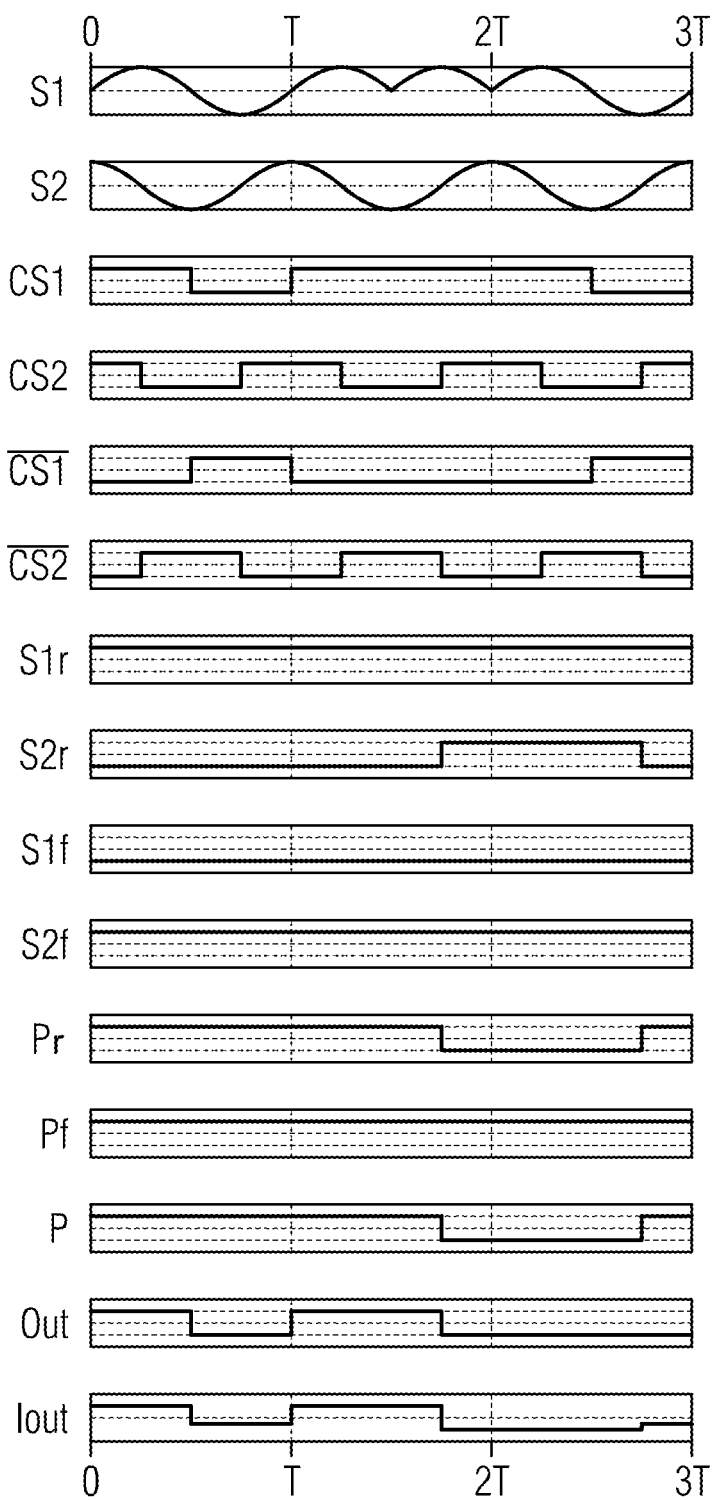
FIG. 4E illustrates a time evolution of signals related to the alerting unit over time for a right turning object with an additional pulse in the first signal.

FIG. 4E shows the signals S1, S2, CS1, CS2, $\overline{CS1}$, $\overline{CS2}$, S1r, S2r, S1f, S2f, Pr, Pf, P, out, and Iout as discussed before in connection with the alerting unit 400 for a system comprising an object moving to the right. Note that between 1T and 2T, hence in the second cycle shown in FIG. 4E, there is a second positive half wave instead of a negative one present for the first signal S1. So during the second half wave of the second cycle, the signal CS1 stays high where it should be low during normal operation. During the second positive half wave of S1 the predefined relationship of S1 being 90° ahead of S2 is violated.

The additional positive half wave in S1 translates to a further positive square pulse within the first comparator signal CS1, while the signal $\overline{CS1}$ shows a second negative square pulse within the second cycle. The signals S2, CS2, and $\overline{CS2}$ are unaltered compared to the situation described in FIG. 4B.

The additional pulse in signal S1 becomes apparent in the signal S2r as this signal samples the value of the first signal S1 (the speed signal) while the second signal S2 crosses zero within a rising edge. Within the second cycle S2r rises to HIGH where it should be ZERO or low during normal operation with the predefined relationship maintained.

The additional pulse in the second cycle of S1 further translates into a change the rising edge parity signal Pr at the first exclusive OR-element X1. During the second half wave of the second cycle Pr changes from a high state to a ZERO or low state. Pf stays in a high state however during the second cycle, as the predefined relationship between signals S1 and S2 is maintained with regards to S1f and S2f, namely at time points, wherein S1 and S2 cross zero within a falling edge, respectively.

The additional pulse in S1 further becomes apparent in the plausibility flag P changing from a high state to a ZERO or low state during the second cycle.

The signal out changes in response to the change in the signal P representing a second positive half wave within the second cycle. The change in the signal out is further apparent in the signal Iout, too. A person of ordinary skill will therefore appreciate that the alerting unit 400 is adapted to indicate an additional pulse within the first signal S1.

Figure 4F:
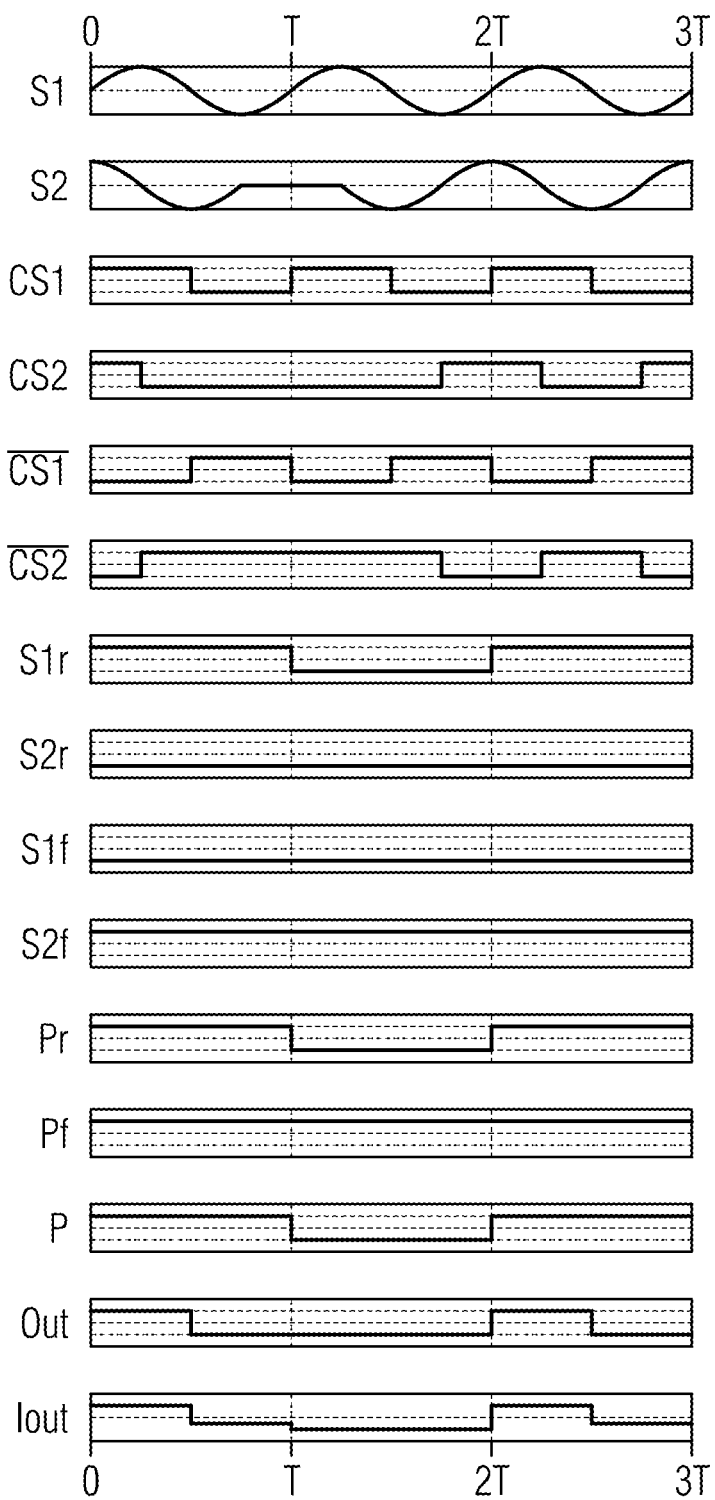
FIG. 4F illustrates a time evolution of signals related to the alerting unit over time for a right turning object with a missing pulse in the second signal.

FIG. 4F shows the signals S1, S2, CS1, CS2, $\overline{CS1}$, $\overline{CS2}$, S1r, S2r, S1f, S2f, Pr, Pf, P, out, and Iout as discussed before in connection with the alerting unit 400 for a system comprising an object moving to the right. Note that around 1T, hence at the end of the first cycle shown in FIG. 4F, there is a positive pulse missing in the directional signal S2. So around the time point T, the signal CS2 stays low where it should be high during normal operation. Around T the predefined relationship of S1 being 90° ahead of S2 is violated.

The missing pulse in S2 at T translates to a missing positive square pulse within the second comparator signal CS2, while the signal $\overline{CS2}$ stays high, where it should be low around T. The signals S1, CS1, and $\overline{CS1}$ are unaltered compared to the situation described in FIG. 4B.

The missing pulse in signal S2 becomes apparent in the signal S1r as this signal samples the value of the second signal S2 (the directional signal) while the first signal S1 crosses zero within a rising edge. At T S1r drops to low where it should be ONE or high during normal operation with the predefined relationship maintained.

The missing pulse at T for S2 further translates into a change of the rising edge parity signal Pr at T, where Pr changes from a high state to a ZERO or low state. Pf stays in a high state however during the second cycle, as the predefined relationship between signals S1 and S2 is maintained with regards to S1f and S2f, namely at time points, wherein S1 and S2 cross zero within a falling edge, respectively.

The missing pulse in S2 further becomes apparent in the plausibility flag P changing from a high state to a ZERO or low state during the second cycle.

The signal out changes in response to the change in the signal P representing a missing positive half wave within the second cycle. The change in the signal out is further apparent in the signal Iout, too. A person of ordinary skill in the art will therefore readily appreciate that the alerting unit 400 is adapted to reliably indicate a missing pulse within the second signal S2, namely the direction signal.

Figure 4G:
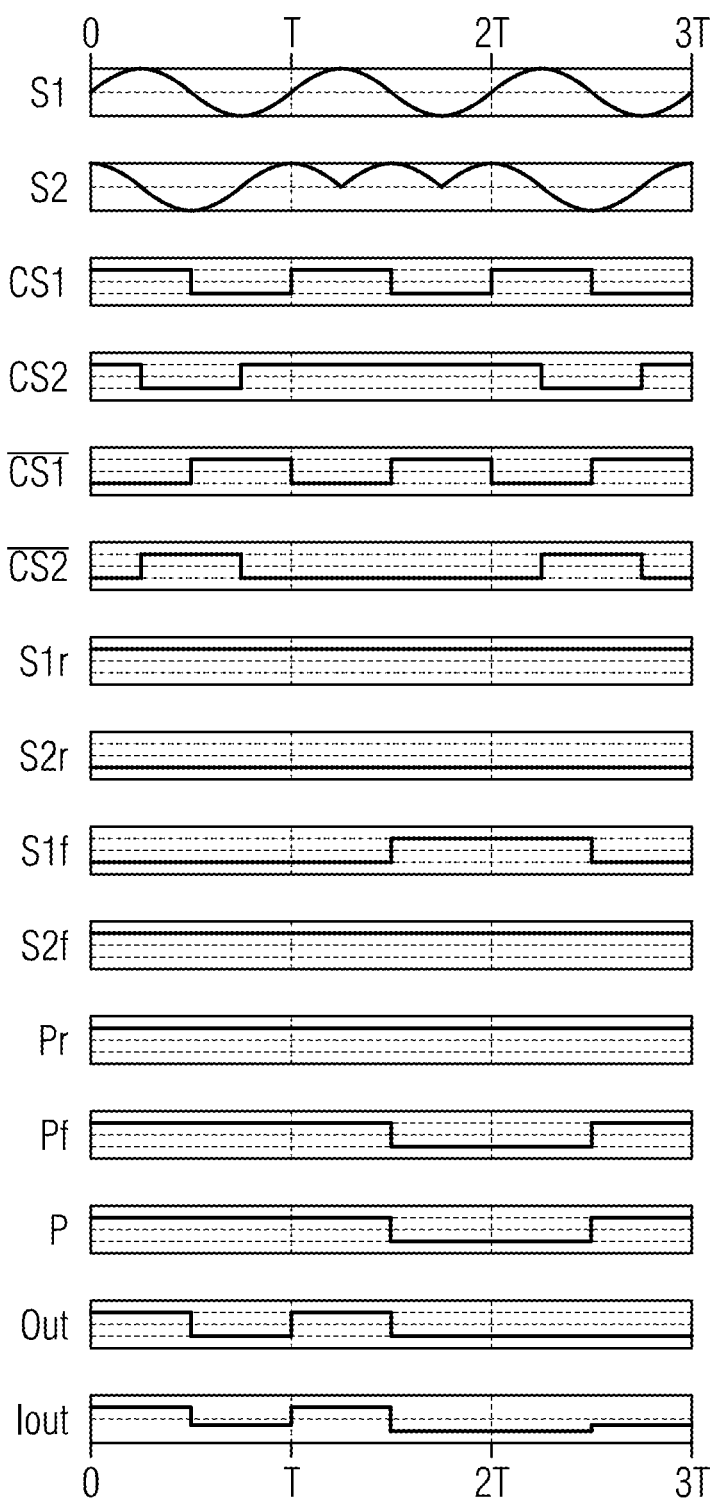
FIG. 4G illustrates a time evolution of signals related to the alerting unit over time for a right turning object with an additional pulse in the second signal.

FIG. 4G shows the signals S1, S2, CS1, CS2, $\overline{CS1}$, $\overline{CS2}$, S1r, S2r, S1f, S2f, Pr, Pf, P, out, and Iout as discussed before in connection with the alerting unit 400 for a system comprising an object moving to the right. Note that there is an additional positive half wave within the second cycle, hence between T and 2T in FIG. 4F, there is an additional positive pulse present in the directional signal S2. So over the whole second cycle, the signal CS2 stays high where it should change from high to low during normal operation. During the additional positive pulse the predefined relationship of S1 being 90° ahead of S2 is violated.

The additional pulse in S2 within the second cycle translates to an additional positive square pulse within the second comparator signal CS2, while the signal $\overline{CS2}$ stays low, where it should be high during normal operation. The signals S1, CS1, and $\overline{CS1}$ are unaltered compared to the situation described in FIG. 4B.

The additional or extra pulse in signal S2 becomes apparent in the signal S1f as this signal samples the value of the second signal S2 (the directional signal) while the first signal S1 crosses zero within a falling edge. For the additional pulse within S2, S1f rises to high where it should be ZERO or low during normal operation with the predefined relationship maintained.

The additional pulse in S2 during the second cycle further translates into a change of the falling edge parity signal Pf during the second cycle, where Pf changes from a high state to a ZERO or low state. Pr stays in a high state however during the second cycle, as the predefined relationship between signals S1 and S2 is maintained with regards to S1r and S2r, namely at time points, wherein S1 and S2 cross zero within a rising edge, respectively.

The additional pulse in S2 further becomes apparent in the plausibility flag P changing from a high state to a ZERO or low state during the second cycle.

The signal out changes in response to the change in the signal P indicating a second positive half wave within the second cycle. The change in the signal out is further apparent in the signal Iout, too. Therefore the alerting unit 400 as discussed herein is configured to indicate an extra pulse within the second signal S2 reliably.

A person of ordinary skill will appreciate that the alerting unit 400 according to the invention is configured to indicate any violation of the predefined relationship between S1 and S2. With the signals CS1, CS2, $\overline{CS1}$, $\overline{CS2}$, S1r, S2r, S1f, and S2f as discussed with regards to FIGS. 4B to 4G, it is possible to indicate whether a pulse is missing or an additional pulse is present within S1 or S2, respectively.

Therefore the alerting unit 400 as described herein may be used to indicate plausibility of signals S1 and S2 with regards to the predefined relationship.

Again, the alerting unit 400 as explained with regards to FIG. 4A-4G may be of interest when it comes to safety critical applications, where a considerable digital core may increase a fault in time rate or FIT-rate. Limiting the FIT-rate may be of particular interest with regards to systems meeting defined security classifications, such as ASIL B, C and/or D.

A person of ordinary skill will further appreciate that the alerting unit 400 as described with regards to FIGS. 4A-4G may be implemented purely within the analogue domain. Alternatively the functionality as described with regards to the FIGS. 4A-4G may be also implemented partly or completely within the digital domain, for example within the digital core as disclosed in FIGS. 3B, 3C, but is not limited thereto. Furthermore an implementation of the alerting unit 400 partly within the digital domain and partly within the analogue domain is conceivable too, as indicated for the embodiment of the sensor system 10 disclosed within FIG. 3B where the comparator 151 receives an analogue signal while the digital core 415 performs the supervision of the predefined relationship.

The term monolithic sensor chip shall be understood throughout the context of this document as a semiconductor chip comprising a certain functionality typically on a single semiconductor chip, such as a single die. The single die shall be construed as comprising setups, wherein more than one dies are coupled in order to implement the certain functionality. The coupling of the more than one dies may be achieved by known technologies providing an electrical and/or mechanical link between the dies, such as vias, wire bonds and the like as known to a person skilled in the art.

If an inventive unit, such as the sensor system 10 or the alerting unit 400 is said to be implemented as a monolithic semiconductor chip, this shall be understood as substantially all features of the inventive unit being implemented on the single semiconductor chip.

Various embodiments of systems, devices and methods have been described herein. These embodiments are given only by way of example and were not intended to limit the scope of the invention. It should be appreciated, moreover, that the various features of the embodiments that have been described may be combined in various ways to produce numerous additional embodiments. While various materials, dimension shapes, configurations and locations etc. have been described for use with the disclosed embodiments, others besides those disclosed may be utilized without exceeding the scope of the invention.

Persons of ordinary skill in the relevant art will recognize that the invention may comprise various features than illustrated in any individual embodiment described above. The embodiments described herein are not meant to be an exhaust of presentation of the ways in which the various features of the invention may be combined. Accordingly, the embodiments are not mutually exclusive combinations of features; rather the invention can comprise a combination of different individual features selected from different individual embodiments as understood by a person of ordinary skill in the art. Moreover, elements described with respect to one embodiment can be implemented in other embodiments even when not such described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended; furthermore, it is intended also to include features of a claim in any other independent claim even if this claim is not directly made dependent to the independent claim. For purpose of interpreting the claims for the present invention, it is expressly intended that the provisions of section 112, 6th paragraph of 35 O.S.C. are not to be invoked unless the specific terms for all steps are recited in a claim.

According to a first aspect a sensor system 10 for sensing movement of an object is disclosed; the sensor system 10 comprising:

a first sensing element 100 providing a first signal S1 along a first signal path 110 on a semiconductor chip, the first signal S1 being indicative of a velocity of the movement;

a second sensing element 200 providing a second signal S2 along a second signal path 210 on the semiconductor chip, the second signal S2 being indicative of a direction of the movement; and an alerting unit 400, wherein the alerting unit 400 is configured to issue a warning if a predefined relationship between the first signal S1 and the second signal S2 is being violated.

In a second aspect the sensor system 10 according to the first aspect is disclosed, wherein the sensor system is implemented as a monolithic, integrated sensor system.

In a third aspect the Sensor system 10 is disclosed according to the first or second aspect, wherein the alerting unit 400 is further configured to monitor the first signal S1 and/or the second signal S2.

In a fourth aspect is disclosed the sensor system 10 according to any of the preceding aspects, wherein the predefined relationship is a selectable predefined relationship.

In a fifth aspect is disclosed the sensor system 10 according to any of the preceding aspects, wherein the predefined relationship is a selectable predefined phase relationship between the first signal S1 and the second signal S2, the first signal S1 and the second signal S2 being periodical signals of substantially identical frequency, respectively, or the first signal S1 and the second signal S2 being quasi-periodical signals of substantially identical frequency.

In a sixth aspect the sensor system 10 according to any of the preceding aspects is disclosed, wherein the alerting unit 400 is implemented as a further semiconductor chip coupled to the semiconductor chip.

In a seventh aspect the Sensor system 10 according to any of the preceding aspects is disclosed, wherein the alerting unit 400 comprises a first comparator 151 configured to indicate that the first signal S1 is above a first base value, the first comparator 151 being arranged downstream the first sensor element 100 within the first signal path 110.

In an eighth aspect is disclosed the Sensor system 10 according to any of the preceding aspects, further comprising an offset unit 115 within the first signal path 110, the offset unit 115 configured to impose an adjustable offset on the first signal S1.

In a ninth aspect is disclosed the sensor system 10 according to any of the preceding aspects, further comprising a first analog-to-digital converter 410 for converting at least the first signal S1.

In a tenth aspect is disclosed the sensor system 10 according to the ninth aspect, further comprising a multiplexer 300 for forwarding the first signal S1 and the second signal S2 to the first analog-to-digital converter 410.

In an eleventh aspect is disclosed the sensor system 10 according to any of eighth aspect to tenth aspect, wherein the offset unit 115 comprises a digital-to-analog converter configured to receive a digital offset.

In a twelfth aspect is disclosed the sensor system 10 according to any of the preceding aspects, wherein the alerting unit 400 is configured to correct or invalidate the first signal S1 and/or the second signal S2 in case of the warning being issued.

In a thirteenth aspect is disclosed the sensor system 10 according to any of the preceding aspects, wherein the alerting unit 400 further is adapted to extract a minimum or maximum value of the second signal S2 during time periods for which the first comparator 151 indicates the first signal S1 being above a first base value.

In a fourteenth aspect is disclosed the sensor system 10 according to any of the preceding aspects, wherein the alerting unit 400 issues a non-warning message indicating while the predefined relationship between the first signal S1 and the second signal S2 is substantially maintained.

In a fifteenth aspect is disclosed the sensor system 10 according to any of the preceding aspects, wherein the first sensing element 100 and the second sensing element 200 are implemented as magnetic sensor elements.

In a sixteenth aspect is disclosed the sensor system 10 according to any of the preceding aspects, wherein the sensor system 10 is operable with magnetic target or pole wheel.

In a seventeenth aspect is disclosed an alerting unit 400 comprising:

a first terminal configured to receive a first signal S1, a second terminal configured to receive a second signal S2, wherein the alerting unit 400 is configured to monitor a predefined relationship between the first signal S1 and the second signal S2.

In an eighteenth aspect is disclosed the alerting unit 400 according to the seventeenth aspect, further adapted to issue a warning, in case the predefined relationship is violated.

In a nineteenth aspect is disclosed the alerting unit according to any of seventeenth aspect or eighteenth aspect, wherein the first signal S1 and the second signal S2 are periodical signals of substantially identical frequency and the predefined relationship is a predefined phase relation.

In a twentieth aspect is disclosed the alerting unit (400) according to any of seventeenth aspect to nineteenth aspect, wherein the predefined relationship is a selectable predefined relationship, preferably ±90° phase difference.

In a twenty-first aspect is disclosed the alerting unit 400 according to any of seventeenth aspect to twentieth aspect, further comprising a first comparator 151 configured to receive the first signal S1 and configured to provide a first comparator signal CS1 indicating when the first signal S1 is above a threshold.

In a twenty-second aspect is disclosed the alerting unit 400 according to any of seventeenth aspect to twenty first aspect, further comprising a second comparator 152 configured to receive the second signal S2 and configured to provide a second comparator signal CS2 indicating when the second signal S2 is above a threshold.

In a twenty-third aspect is disclosed the alerting unit 400 according to any of seventeenth aspect to twenty second aspect, further comprising a first memory element F1, the first memory element F1 providing a rising edge signal S1r sampling the second signal S2 at a point in time when the first signal S1 passes zero within a rising edge.

In a twenty-fourth aspect is disclosed the alerting unit 400 according to any of seventeenth aspect to twenty third aspect, further comprising a second memory element (F2), the second memory element (F2) providing a rising edge signal (S2r) sampling the first signal (S1) at a point in time when the second signal (S2) passes zero within a rising edge.

In a twenty-fifth aspect is disclosed the alerting unit 400 according to any of seventeenth aspect to twenty-fourth aspect, further comprising a third memory element F3, the third memory element F3 providing a falling edge signal S1f sampling the second signal S2 at a point in time when the first signal S1 passes zero within a falling edge.

In a twenty-sixth aspect is disclosed the alerting unit 400) according to any of seventeenth aspect to twenty-fifth aspect, further comprising a fourth memory element F4 seventeenth aspect to twenty-fourth aspect, the fourth memory element F4 providing a falling edge signal S2f sampling the first signal S1 at a point in time when the second signal S2 passes zero within a falling edge.

In a twenty-seventh aspect is disclosed the alerting unit 400 according to any of seventeenth aspect to twenty-sixth aspect, further configured to provide a rising edge parity signal Pr.

In a twenty-eighth aspect is disclosed the alerting unit 400 according to any of seventeenth aspect to twenty-seventh aspect, further configured to provide a falling edge parity signal Pf.

In a twenty-ninth aspect is disclosed the alerting unit 400 according to the twenty-seventh aspect, further comprising a first exclusive OR element X1, wherein the first exclusive OR element X1 combines the rising edge signals S1r and S2r in order to provide the rising edge parity signal Pr.

In a thirtieth aspect is disclosed the alerting unit 400 according to the twenty-eighth aspect, further comprising a second exclusive OR element X2, wherein the second exclusive OR element X2 combines the falling edge signals S1f and S2f in order to provide the falling edge parity signal Pf.

In a thirty-first aspect is disclosed the alerting unit 400 according to any of the first aspect to the thirtieth aspect, further configured to provide a plausibility flag P indicating that the predefined relationship between the first signal S1 and the second signal S2 is maintained.

In a thirty-second aspect is disclosed the alerting unit 400 according to the twenty-ninth aspect, further comprising an AND element A configured to combine the rising edge parity signal Pr and the falling edge parity signal Pf in order to provide the plausibility flag P.

In a thirty-third aspect is disclosed the alerting unit 400 according to any of seventeenth aspect to thirty-second aspect, further configured to receive the first signal S1, the second signal S2 in the analogue domain.

In a thirty-fourth aspect is disclosed the alerting unit 400 according to any of seventeenth aspect to thirty-third aspect, further configured to provide at least one of the first comparator signal CS1, the second comparator signal CS2, the rising edge signal S1r, the rising edge signal S2r, the falling edge signal S1f, the falling edge signal S2f, the rising edge parity signal Pr, the falling edge parity signal Pf, and the plausibility flag P in the digital domain.

In a thirty-fifth aspect is disclosed the alerting unit 400 according to any of seventeenth aspect to thirty-third aspect, further configured to provide at least one of the first comparator signal CS1, the second comparator signal CS2, the rising edge signal S1r, the rising edge signal S2r, the falling edge signal S1f, the falling edge signal (S2f), the rising edge parity signal Pr, the falling edge parity signal Pf, and the plausibility flag P in the analogue domain.

In a thirty-sixth aspect is disclosed the alerting unit 400 according to any of seventeenth aspect to thirty-fifth aspect, wherein the alerting unit 400 is implemented on a semiconductor chip.

In a thirty-seventh aspect is disclosed the alerting unit 400 according to any of seventeenth aspect to thirty-fifth aspect, wherein the alerting unit 400 is implemented as a monolithic semiconductor chip.

REFERENCE NUMERALS 10 sensor system
100 first sensing element
110 first signal path
115 offset unit
120 first amplifier
140 first filter
151 first comparator
152 second comparator
195 sensor supply block
200 second sensing element
210 second signal path
220 second amplifier
240 second filter
300 multiplexer
400 alerting unit
410 first ADC
415 digital core
420 second ADC
450 oscillator
480 current modulator
250 second comparator 490 PMU
S1 first signal, speed signal
S2 second signal, directional signal
CS1 first comparator signal
CS2 second comparator signal
CS1 inverted first comparator signal
CS2 inverted second comparator signal
S1r signal sampling S2 while S1 crosses zero within rising edge
S2r signal sampling S1 while S2 crosses zero within rising edge
S1f signal sampling S2 while S1 crosses zero within falling edge
S2f signal sampling S1 while S2 crosses zero within falling edge
Pr rising edge parity signal
Pf falling edge parity signal
P plausibility flag
out output signal
Iout current output signal
INV1 first inverter
INV2 second inverter
X1 first XOR (exclusive OR) element
X2 second XOR element
F1 first memory element
F2 second memory element
F3 third memory element
F4 fourth memory element
A first AND element
A2 second AND element

We claim:

1. A sensor system for sensing movement of an object, comprising:
a first sensor providing a first signal along a first signal path on a semiconductor chip, the first signal being used to determine a first characteristic of the movement;
a second sensor providing a second signal along a second signal path on the semiconductor chip, the second signal being used to determine a second characteristic of the movement; and
an alarm circuit configured to issue a fault warning when there is a violation of a predefined relationship between the first signal and the second signal based on a missing or additional portion of the first signal or the second signal.

2. The sensor system according to claim 1, wherein the sensor system is implemented as a monolithic, integrated sensor system.

3. The sensor system according to claim 1, wherein the alarm circuit is further configured to monitor the first signal and/or the second signal.

4. The sensor system according to claim 1, wherein the predefined relationship is a selectable predefined relationship.

5. The sensor system according to claim 1, wherein the predefined relationship is a selectable predefined phase relationship between the first signal and the second signal, the first signal and the second signal being periodical signals of substantially identical frequency, respectively, or the first signal and the second signal being quasi-periodical signals of substantially identical frequency.

6. The sensor system according to claim 1, wherein the alarm circuit is implemented as a further semiconductor chip coupled to the semiconductor chip.

7. The sensor system according to claim 1, wherein the alarm circuit comprises a first comparator configured to determine when the first signal is above a first base value, the first comparator being arranged downstream the first sensor within the first signal path.

8. The sensor system according to claim 1, further comprising an offset circuit within the first signal path, the offset circuit configured to impose an adjustable offset on the first signal.

9. The sensor system according to claim 1, further comprising an analog-to-digital converter configured to convert at least the first signal.

10. The sensor system according to claim 9, further comprising a multiplexer configured to forward the first signal and the second signal to the analog-to-digital converter.

11. The sensor system according to claim 8, wherein the offset circuit comprises a digital-to-analog converter configured to receive a digital offset.

12. The sensor system according to claim 1, wherein the alarm circuit is configured to correct or invalidate the first signal and/or the second signal in case of the fault warning being issued.

13. The sensor system according to claim 1, wherein the alarm circuit is further configured to extract a minimum or maximum value of the second signal during time periods for which the first comparator determines the first signal is above a first base value.

14. The sensor system according to claim 1, wherein the alarm circuit is configured to issue a non-fault-warning message while the predefined relationship between the first signal and the second signal is substantially maintained.

15. The sensor system according to claim 1, wherein the first characteristic is speed.

16. The sensor system according to claim 15, wherein the second characteristic is speed.

17. The sensor system according to claim 15, wherein the second characteristic is direction.

18. The sensor system according to claim 1, wherein the warning indicates that the first signal or the second signal is not reliable.

19. The sensor system according to claim 1, further comprising:
a first memory circuit configured to provide a first rising edge signal sampling the second signal at a point in time when the first signal passes zero within a rising edge; and/or
a second memory circuit configured to provide a second rising edge signal sampling the first signal at a point in time when the second signal passes zero within a rising edge.

20. The sensor system according to claim 1, further comprising:
a third memory circuit configured to provide a first falling edge signal sampling the second signal at a point in time when the first signal passes zero within a falling edge; and/or
a fourth memory circuit configured to provide a second falling edge signal sampling the first signal at a point in time when the second signal passes zero within a falling edge.

* * * * *